(12) United States Patent
Cann

(10) Patent No.: US 7,603,823 B2
(45) Date of Patent: Oct. 20, 2009

(54) WALL PANEL AND WALL PANEL SYSTEM

(75) Inventor: Robert John Buckingham Cann, Dalkeith (AU)

(73) Assignee: Superwall Systems Pty. Ltd., West Perth, Western Australia (AU)

( * ) Notice: Subject to any disclaimer, the term of this patent is extended or adjusted under 35 U.S.C. 154(b) by 565 days.

(21) Appl. No.: 11/275,329

(22) Filed: Dec. 23, 2005

(65) Prior Publication Data

US 2006/0150531 A1 Jul. 13, 2006

(30) Foreign Application Priority Data

Dec. 23, 2004 (AU) .............................. 2004907281
Jun. 17, 2005 (AU) .............................. 2005903178

(51) Int. Cl.
*E04B 1/70* (2006.01)

(52) U.S. Cl. .................... 52/302.1; 52/302.7; 52/11; 52/16; 52/2.22; 52/2.23; 52/168; 52/425; 52/426; 137/357; 137/360; 137/574

(58) Field of Classification Search ............... 52/425, 52/426, 2.22, 2.23, 168, 11, 16, 302.1, 302.7; 137/357, 360, 574
See application file for complete search history.

(56) References Cited

U.S. PATENT DOCUMENTS 2,261,510 A * 11/1941 Atcheson ..................... 52/97
3,024,879 A * 3/1962 Kandra ..................... 52/783.1
3,935,681 A * 2/1976 Voiturier et al. ................ 52/1
5,535,565 A * 7/1996 Majnaric et al. ............. 52/426

(Continued)

FOREIGN PATENT DOCUMENTS

AU 199453008 7/1994

(Continued)

OTHER PUBLICATIONS

AU Search Report for AU Patent Application 2004907281 (Feb. 9, 2005).

(Continued)

*Primary Examiner*—Richard E Chilcot, Jr.
*Assistant Examiner*—Joshua Ihezie
(74) *Attorney, Agent, or Firm*—Nixon & Vanderhye P.C.

(57) ABSTRACT

A wall panel 100 has an elongate hollow body portion 102 having a storage cavity 103 provided therein for retaining water. The body portion 102 has a rectangular cross-section defined by an inner wall 104 and an outer wall 106 held in spaced apart relation by two side walls 108a and 108b. Each side wall 108 is adapted to be joined to the side wall 108 of an adjacent wall panel 100' so as to form a wall tank 110 for a building. Each wall panel 100 thus forms a structural component of the wall 110, which is sufficiently strong to support a roof structure 112 thereon. The side walls 108 are provided with an opening 120 therein, adapted to align with a matching opening 120' in the side wall 108' of an adjacent wall panel 100', to permit the communication of water from the cavity 103 in one wall panel to the cavity 103' in the adjacent wall panel. The storage cavity 103 is bounded at the top by a lid 132 and at the bottom by a base tray 130.

41 Claims, 17 Drawing Sheets

U.S. PATENT DOCUMENTS

| | | | | |
|---|---|---|---|---|
| 5,657,601 | A | * | 8/1997 | Bean et al. .................... 52/426 |
| 5,768,851 | A | * | 6/1998 | Nagaoka .................... 52/790.1 |
| 6,070,380 | A | * | 6/2000 | Meilleur .................... 52/309.7 |
| 6,260,320 | B1 | * | 7/2001 | Di Lorenzo ................. 52/414 |
| 6,345,483 | B1 | * | 2/2002 | Clark ........................ 52/649.1 |
| 6,357,183 | B1 | * | 3/2002 | Smith ............................ 52/15 |
| 6,401,419 | B1 | * | 6/2002 | Beliveau ................... 52/592.6 |
| 6,698,150 | B1 | * | 3/2004 | DiLorenzo ................... 52/414 |
| 6,742,758 | B2 | * | 6/2004 | Janesky ........................ 249/7 |
| 6,792,729 | B2 | * | 9/2004 | Beliveau ..................... 52/426 |
| 2001/0029717 | A1 | * | 10/2001 | Spakousky ................ 52/405.4 |
| 2003/0095834 | A1 | * | 5/2003 | Witcher ........................ 404/6 |
| 2006/0150531 | A1 | * | 7/2006 | Cann ............................ 52/11 |

FOREIGN PATENT DOCUMENTS

| | | |
|---|---|---|
| AU | 199340089 | 12/1994 |
| AU | 200062434 | 4/2001 |
| GB | 2366831 | 3/2002 |
| WO | 2004003934 | 1/2004 |

OTHER PUBLICATIONS

Davidson and O'Sullivan, "Waterwall", Thenewinventors magazine, p. 41 (Summer Apr. 2005).

* cited by examiner

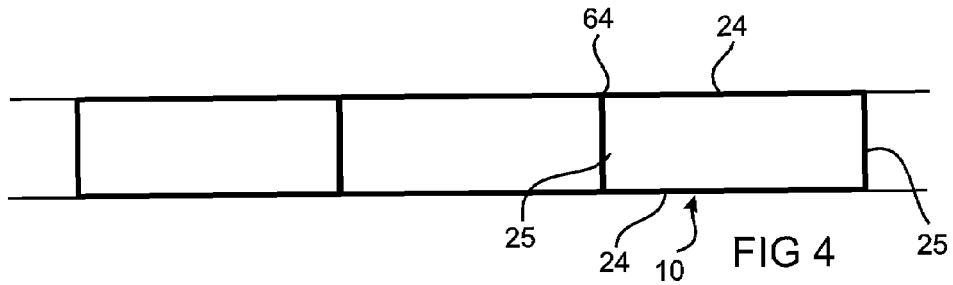
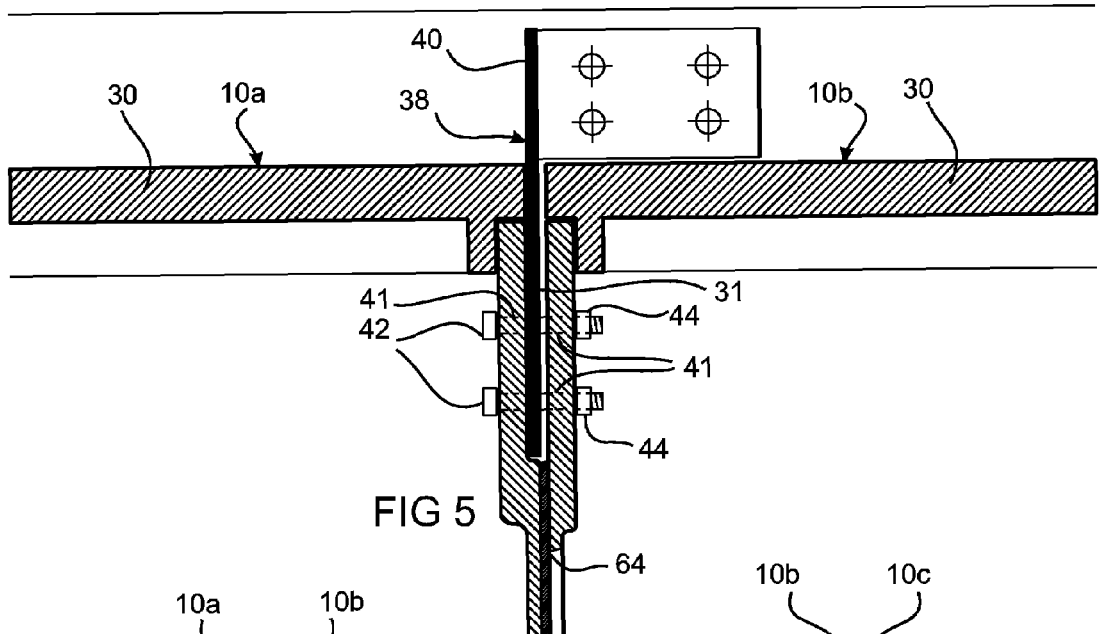
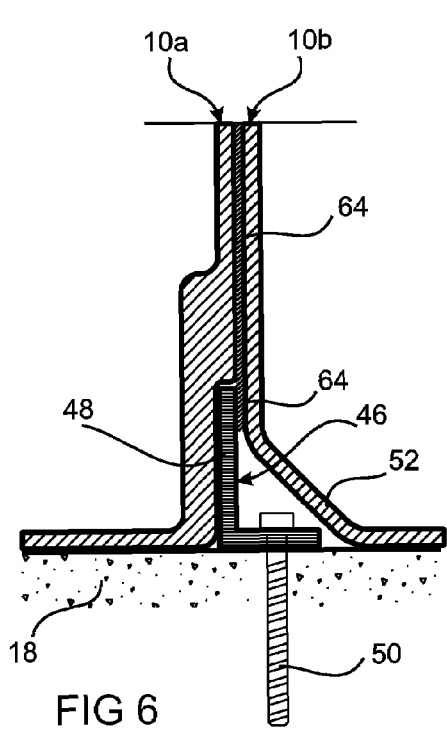
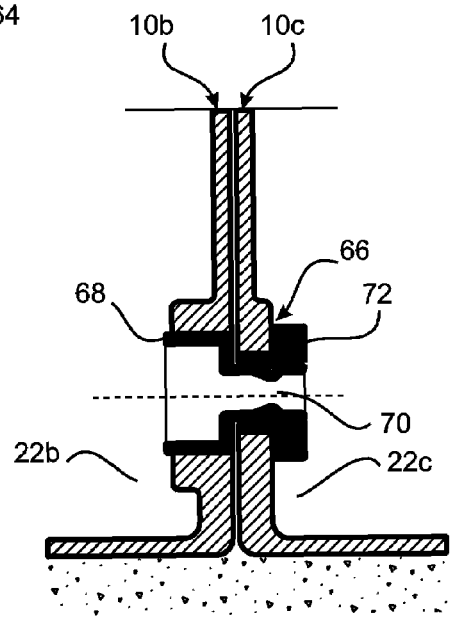

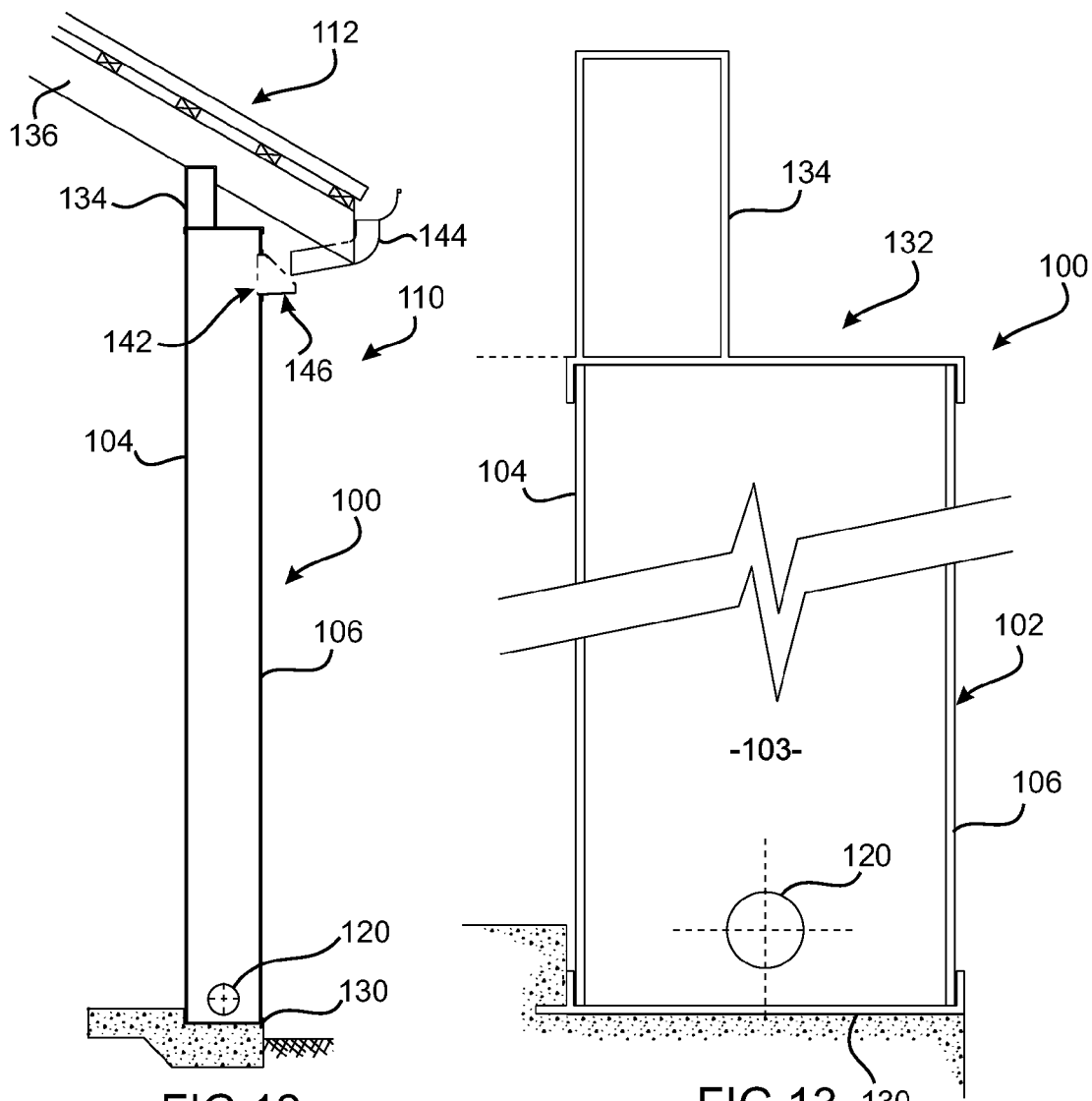
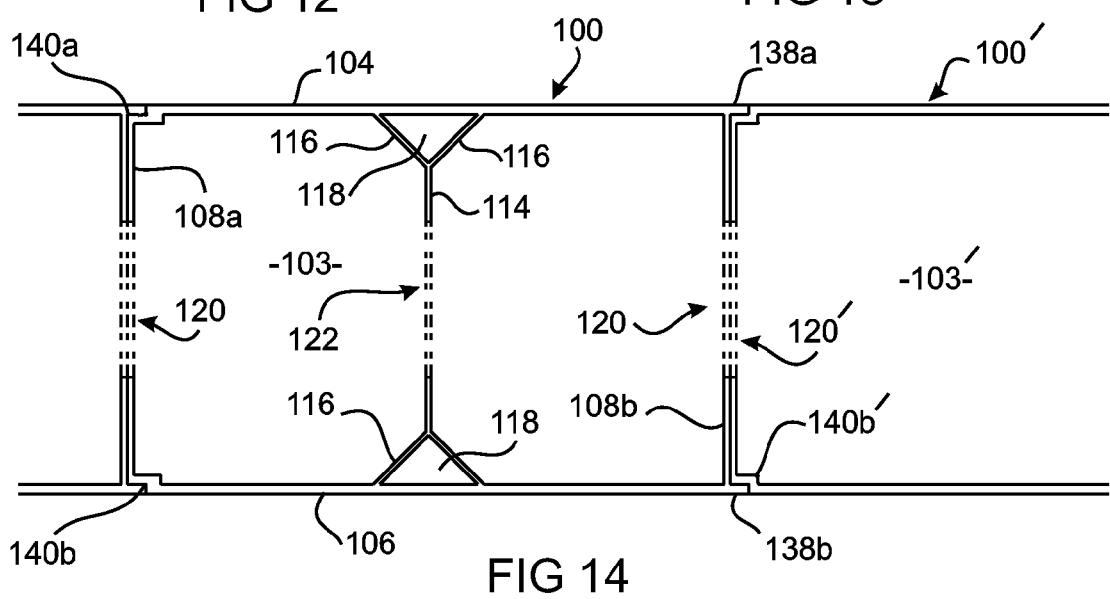
FIG 12
FIG 13
FIG 14

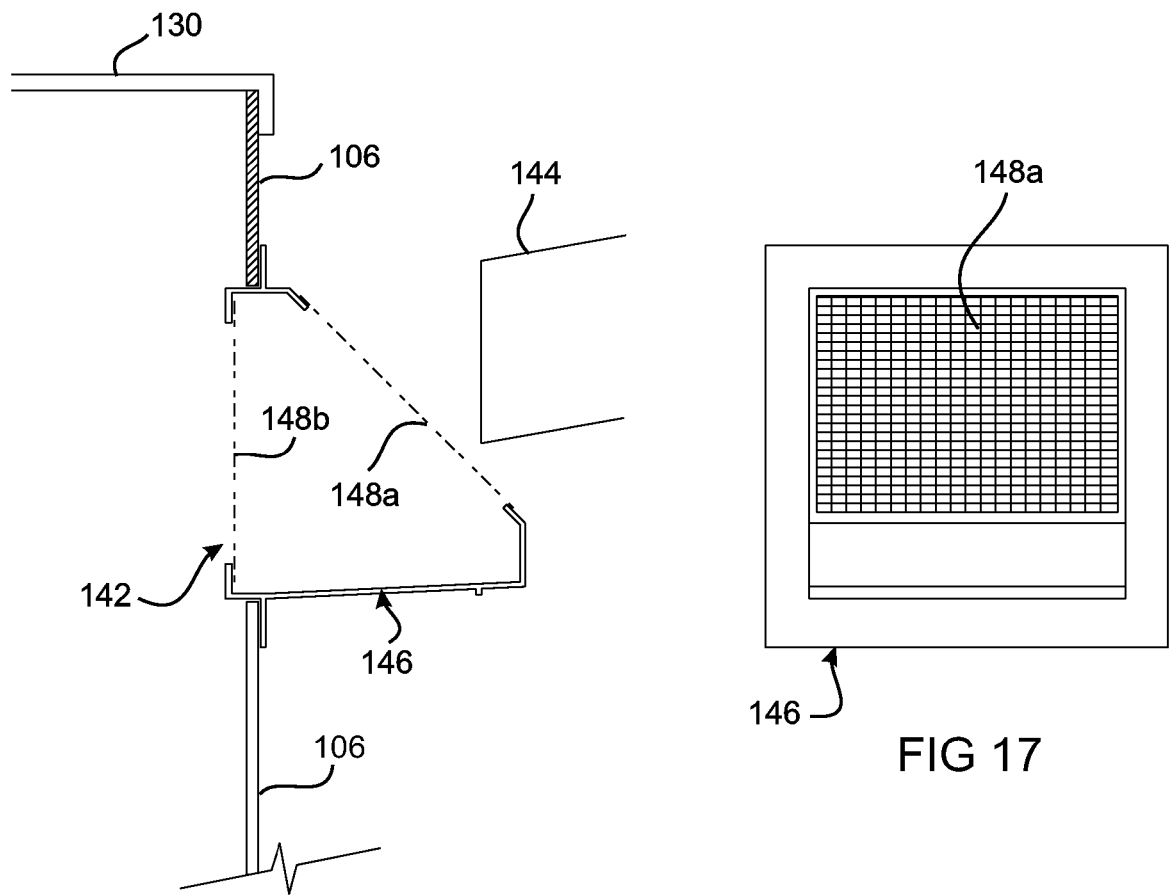
FIG 16
FIG 17
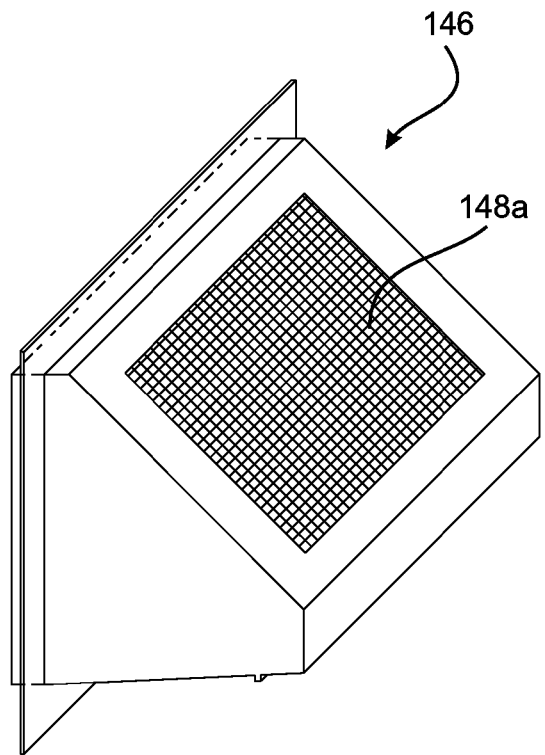
FIG 18

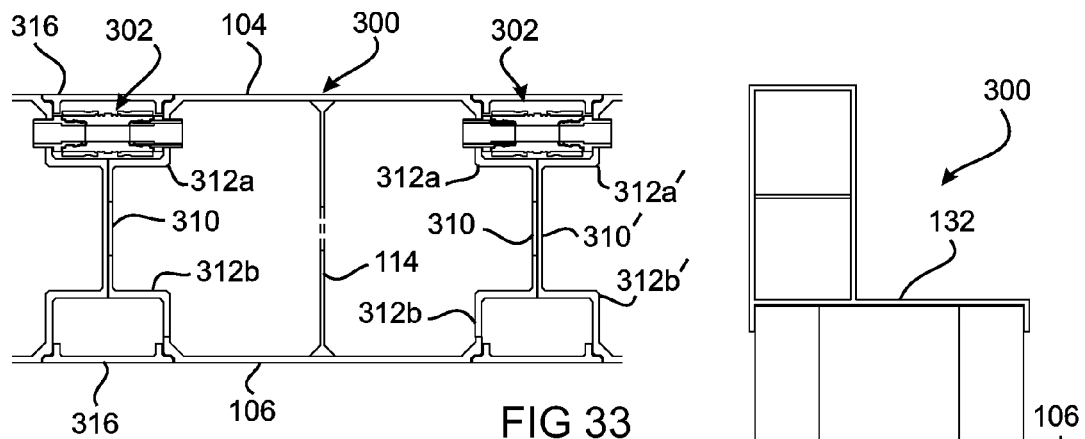
FIG 33
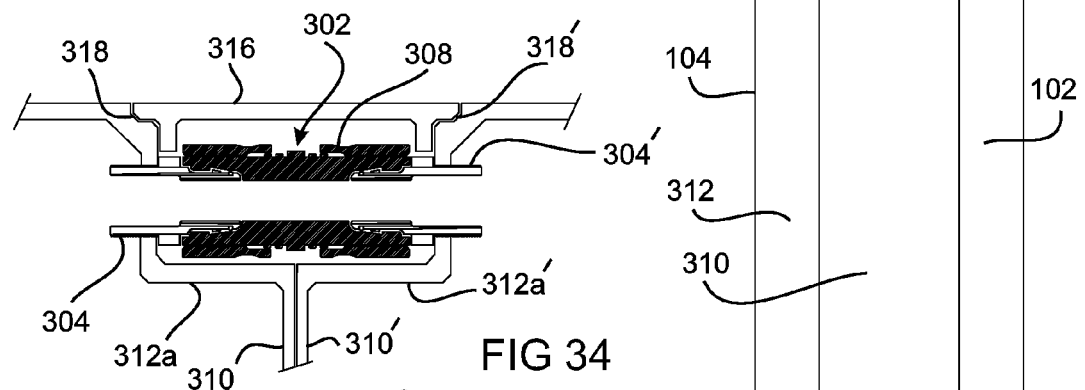
FIG 34
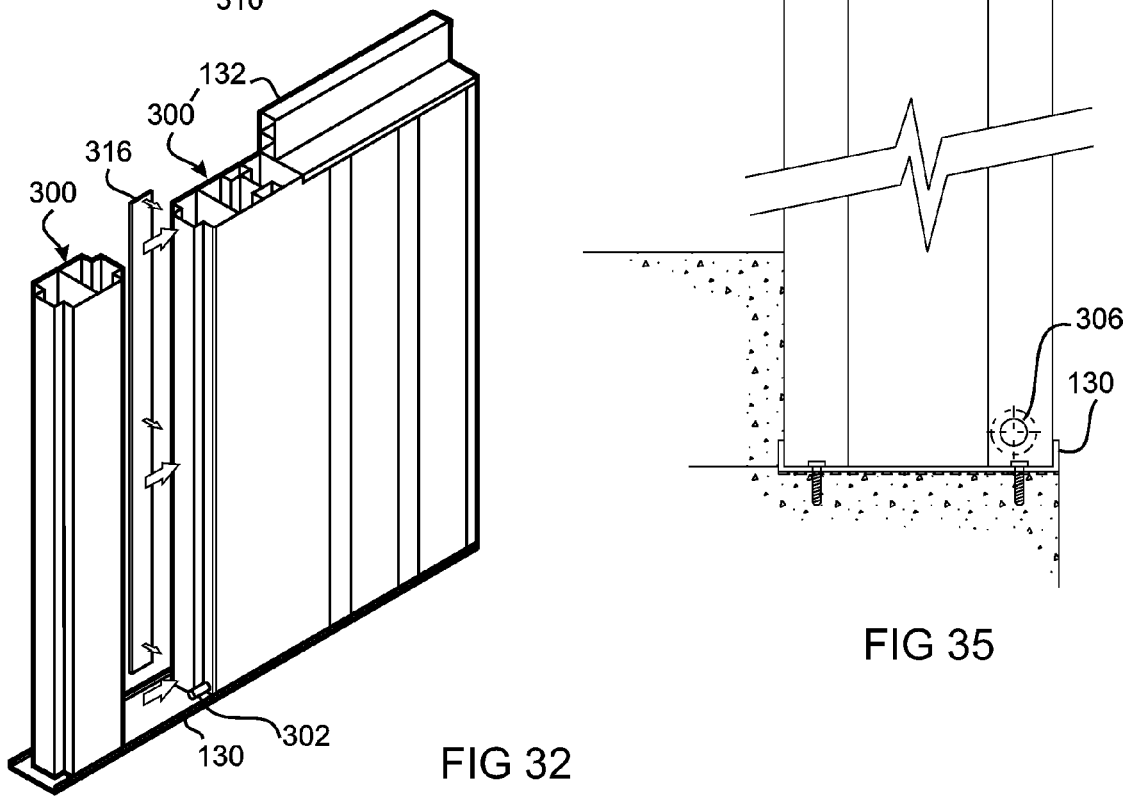
FIG 32
FIG 35

WALL PANEL AND WALL PANEL SYSTEM

This application claims the benefit of Australian provisional patent application 2004907281 filed on 23 Dec. 2004 and Australian provisional patent application 2005903178 filed on 17 Jun. 2005, the entirety of which are incorporated by reference.

FIELD OF THE INVENTION

The present invention relates to a wall panel and a wall panel system for use particularly, though not exclusively, as water storage means in building structures such as houses.

BACKGROUND TO THE INVENTION

Pressures on water resources in Australia, and other low rainfall countries and regions, have brought about water restrictions in many areas. This in turn has led to incentive schemes by government authorities to encourage people to save water. These incentive schemes include offering to consumers rebates for the installation of water saving devices as well as for the installation of water storage devices.

Traditional water storage devices have included stand-alone water tanks, for example for the collection of rainwater. These tanks are often bulky and aesthetically unpleasing. As a result, there is a need to provide water storage facilities of a less intrusive design, for example that may be placed in close proximity to a building, or hidden in gardens.

There is also a need to recycle "grey" household waste water for example from washing machines and showers, as a means of saving water.

The present invention was developed with a view to providing a wall panel and a wall panel system which can be incorporated as a structural component into a wall of a building so as to be virtually invisible to the outside observer.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a wall panel comprising a hollow body portion defining a cavity therein for retaining a fluid, an upper attachment means on an upper end of the body portion for fixing the body portion to a first building structure of a building, and a lower attachment means on a lower end of the body portion for fixing the body portion to a second building structure of the building, so that in use the wall panel provides a substantially rigid component to at least partially support the first building structure.

Preferably, the body portion is generally planar and rectangular in shape. The body portion preferably has two opposing first side walls, two opposing second side walls, an upper wall and a lower wall. The cavity is preferably bounded by the side, upper and lower walls so that the storage volume provided by the cavity in the panel is maximized. The upper wall may be in the form of a removable lid.

According to a further aspect of the present invention there is provided a wall panel for storing water in the wall of a building, the wall panel comprising:

an elongate hollow body portion having a storage cavity therein for retaining water, the body portion having a quadrilateral cross-section defined by an outer wall and an inner wall held in spaced apart relation by two side walls, each side wall being adapted to be joined to the side wall of an adjacent wall panel so as to form a wall for a building, each wall panel thus providing a structural component of the wall sufficiently strong to support a roof structure thereon.

According to a still further aspect of the present invention there is provided a wall panel system for storing water in the wall of a building, the wall panel system comprising:

a plurality of wall panels adapted to be joined in a side by side arrangement so as to form a wall for a building, each wall panel comprising an elongate hollow body portion having a storage cavity therein for retaining water, the body portion having a quadrilateral cross-section defined by an outer wall and an inner wall held in spaced apart relation by two side walls, each side wall being adapted to be joined to the side wall of an adjacent wall panel, each wall panel thus providing a structural component of the wall sufficiently strong to support a roof structure thereon.

Preferably each of the inner, outer and side walls of the body portion are substantially planar. Preferably the inner wall of the body portion is oriented substantially parallel to the outer wall. Preferably the two side walls are also oriented substantially parallel to each other. Preferably the body portion has a substantially rectangular cross-section. Advantageously the body portion further comprises an internal wall extending between said inner and outer walls to provide additional structural strength and rigidity. Preferably said internal wall is oriented substantially parallel to the side walls. Advantageously said internal wall is fixed to the inner and outer walls by means of a respective pair of webs, that together with the inner wall and the outer wall respectively form a pair of dry cells that are sealed off from the remainder of the cavity.

Preferably at least one of the side walls is provided with an opening therein, adapted to align with a matching opening in the side wall of an adjacent wall panel, to permit the communication of water from the cavity in one wall panel to the cavity in the adjacent wall panel. Preferably said opening is positioned adjacent a lower end of the body portion. Preferably the internal wall is similarly provided with an opening to permit water in the cavity to communicate from one side of the internal wall to the other.

Preferably the wall panel further comprises a lower wall for sealing the lower end of the body portion, and an upper wall for sealing the upper end of the body portion. The storage cavity is preferably bounded by said inner, outer, side, upper and lower walls so that the storage volume provided by the cavity in the panel is maximized. The upper wall may be in the form of a lid adapted to seal the upper ends of the body portions of a plurality of wall panels arranged side by side to form a wall. The lower wall may be in the form of a tray adapted to seal the lower ends of the body portions of a plurality of wall panels arranged side by side to form a wall, the tray thus forming a base of the wall. Preferably the lid may have a beam formed integral therewith and shaped to accept roof rafters thereon.

The body portion is preferably made of structural reinforced plastic or high density structural fibreglass. These materials assist in giving the panel the required strength to form an effective structural component of the building and to have the strength to support a roof structure.

Preferably the wall panel further comprises connecting means to assist in connecting the side walls of adjacent body portions together. Preferably said connecting means comprises first and second lips extending longitudinally along first and second edges of one side wall of the body portion and matching first and second recesses extending longitudinally along first and second edges of the other side wall of the body portion, wherein when adjacent wall panels are joined together the first and second lips on the side wall of one wall panel are received in the matching first and second recesses in the side wall of the adjoining wall panel. Preferably said first and second lips and matching recesses are provided with a key system, wherein the lips are keyed to the recesses to further inhibit separation of adjacent wall panels once they are joined.

The body portion of selected wall panels may further comprise an opening adapted to allow collected water to pass into the storage cavity. The opening is preferably located at the upper end of the body portion and may be connected to an outlet of a guttering downpipe. In this way, rainwater may be collected from the roof which passes into the cavity for storage and later use as required. The opening may be fitted with a rain head having a filter mesh to inhibit ingress of leaves and other debris into the cavity when rainwater passes from the guttering downpipe into the storage cavity.

The wall panel may preferably be further provided with a dispensing means such as a tap to allow release of the water from the cavity.

Each wall panel typically has outer dimensions of approximately 400 mm by 250 mm by 2600 mm and is made of 6 mm thick UV stabilised potable water grade, structural fibreglass. The cavity of the wall panel is typically designed to hold about 260 liters of water but this size can be varied to suit particular needs.

Fastening means for fixing adjacent panels together may comprise chemical means, for example a bonding agent, sealant, or glue such as fibreglass glue. Alternatively, the fastening means may comprise mechanical means such as bolts, screws, or brackets.

The wall panel system may further comprise a door frame adapted to be connected to the side walls of wall panels on respective sides of the doorway. Preferably said door frame is provided with connecting means comprising a lip extending longitudinally on one side of the door frame and a matching recess extending longitudinally on the other side of the door frame, said lip and matching recess being adapted to connect with a respective matching recess and lip provided on the side walls of the wall panels on respective sides of the door way.

The wall panel system may further comprise floor tank for storing water situated in a floor of the building. The floor tank may be one of a plurality of floor tanks. Preferably said plurality of floor tanks are interconnected by means of a connection cap that fits over the ends of multiple tanks to allow communication of water between the tanks. Advantageously the base of the wall formed by the wall panels rests on an upper surface of said floor tank or tanks. Preferably the base of the wall is provided with a plurality of straps for securing the wall to a concrete footing, to provide additional security in cyclone prone areas.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The invention will be better understood by reference to the following description of several specific embodiments of the wall panel and wall panel system, given by way of example only, with reference to the accompanying drawings, in which:

FIG. 4 is a top view of a portion of the wall panel system as shown in FIG. 3;

FIG. 5 is a side sectional view of the upper ends of two adjacent wall panels according to the first embodiment;

FIG. 6 is a side sectional view of the lower ends of two adjacent wall panels according to the first embodiment;

FIG. 7 is a side sectional view of the lower ends of two adjacent wall panels according to the first embodiment;

FIG. 12 is an end view of a wall incorporating a third embodiment of a wall panel system according to the invention;

FIG. 13 is an enlarged side view of a wall panel employed in the wall panel system of FIG. 12;

FIG. 14 is a section view of the wall panel system of FIG. 12;

FIG. 16 is a side section view of a rain head employed in the wall panel system of FIG. 12;

FIG. 17 is a front view of the rain head of FIG. 16;

FIG. 18 is a front perspective view of the rain head of FIG. 16;

FIG. 32 is a perspective view of a fifth embodiment of a wall panel system according to the invention;

FIG. 33 is a section view of a wall panel employed in the wall panel system of FIG. 32;

FIG. 34 is an enlarged view of a tank connection between wall panels employed in the wall panel system of FIG. 32; and, FIG. 35 is a side elevation of a wall panel employed in the wall panel system of FIG. 32 including a lid and base tray.

DETAILED DESCRIPTION OF PREFERRED EMBODIMENTS

Figure 1:
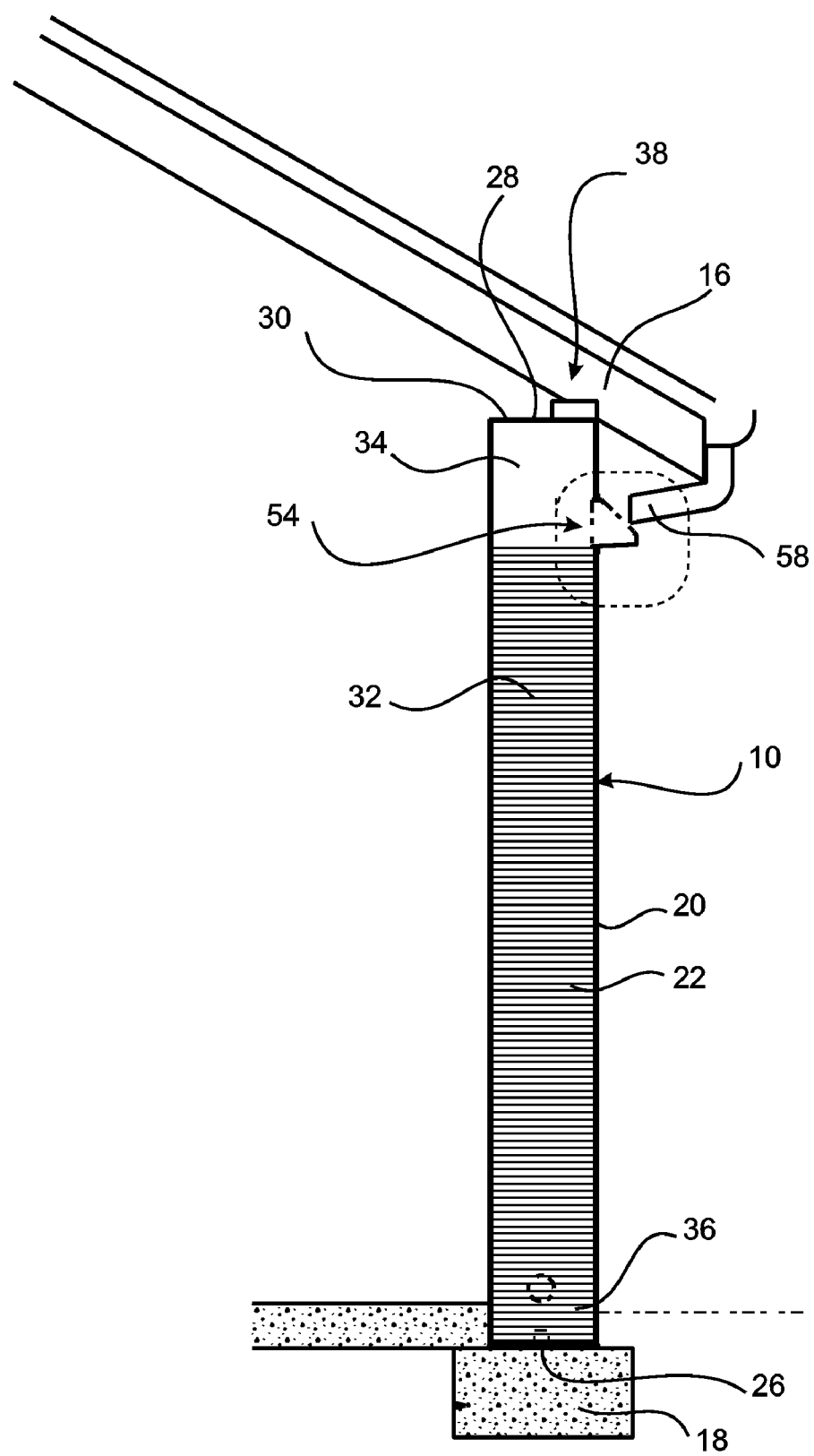
FIG. 1 is a side view of a wall panel according to a first embodiment positioned between a roof structure and a concrete footing of a building.
Figure 2:
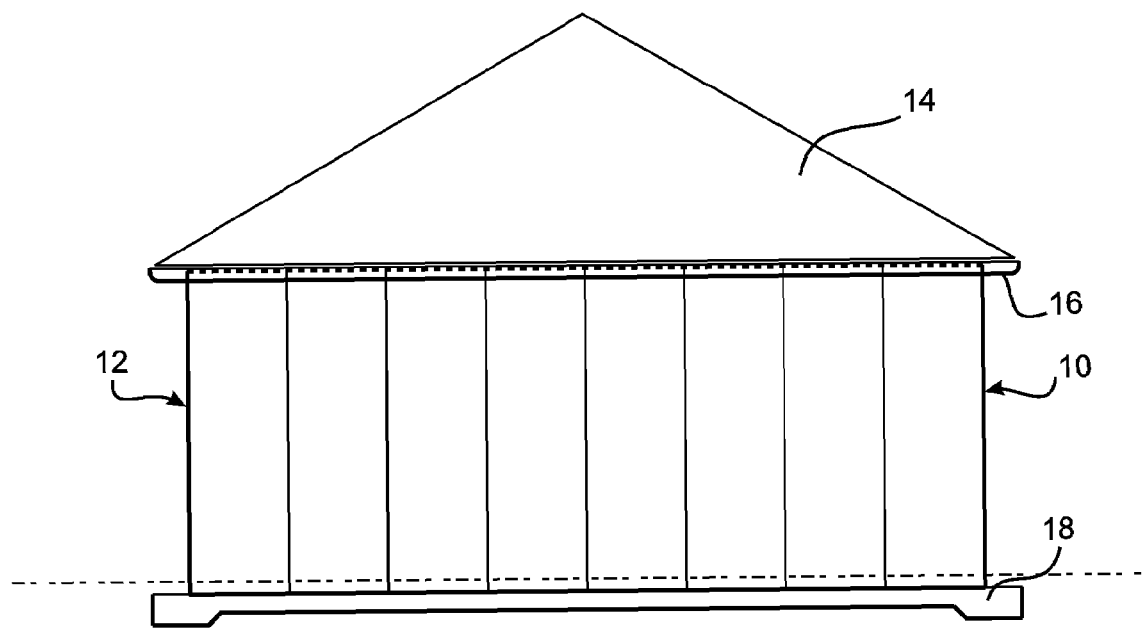
FIG. 2 is a side view of a building showing a wall panel system comprising wall panels according to the embodiment of FIG. 1.
Figure 3:
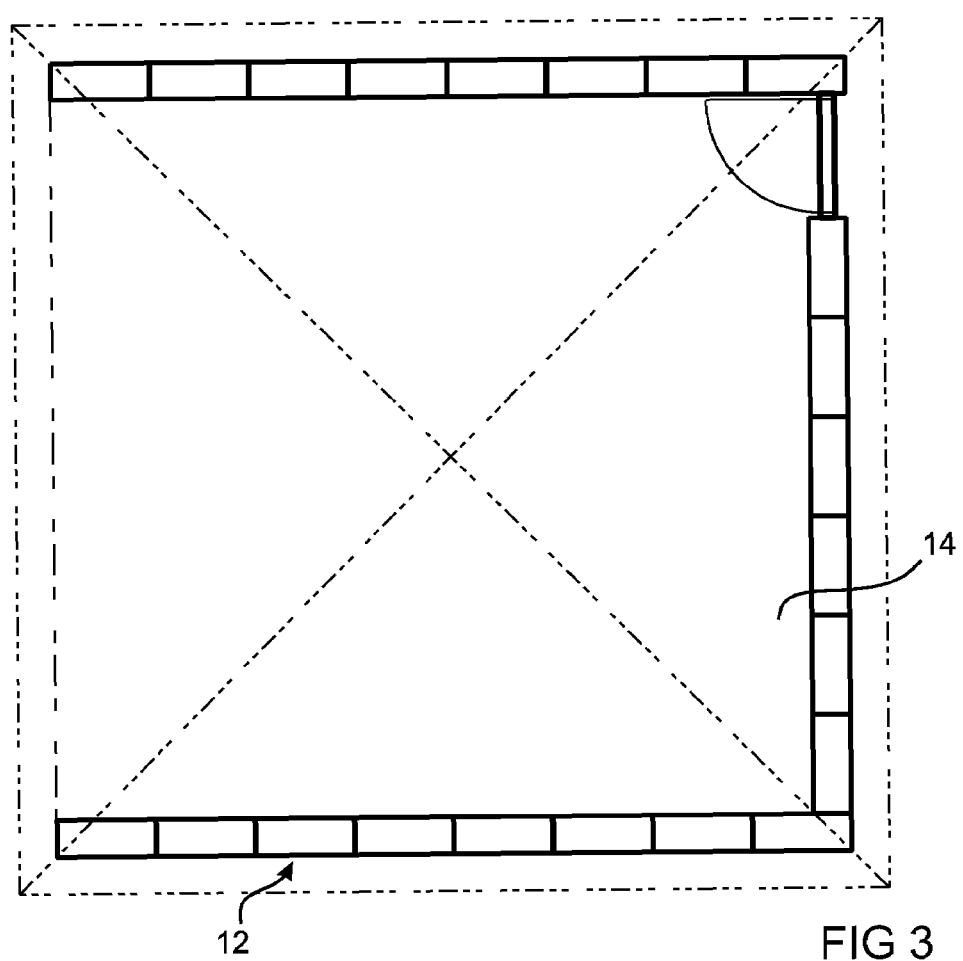
FIG. 3 is a top plan view of the building of FIG. 2.

Referring to FIGS. 1, 2 and 3, there is shown a first embodiment of a wall panel according to the invention generally indicated by the numeral 10. There is further shown a first embodiment of a wall panel system according to the invention generally indicated by the numeral 12 (see FIGS. 2 and 3), the wall panel system 12 comprising a number of wall panels 10 in a side by side arrangement. The wall panel 10 is positioned vertically between a first building structure in the form of a roof structure 16 and a second building structure in the form of concrete footings 18.

The wall panel 10 comprises a hollow body portion 20 having a cavity 22 therein. As can be seen most clearly in FIGS. 1 and 4, the wall panel 10 comprises opposing first side walls 24, opposing second side walls 25, a lower wall 26 and an upper wall 28. In this first embodiment, the upper wall 28 is in the form of a removable lid 30. Water 32 is stored in the cavity 22.

The body portion 20 of the wall panel 10 comprises an upper end 34 and a lower end 36. The wall panel 10 further comprises upper attachment means 38, positioned on the upper end 34 of the body portion 20. The upper attachment means 38 is in the form of a first steel bracket 40 which is positioned in the space 31 between adjacent panels 10a and 10b as best seen in FIG. 5. The bracket 40 is secured to adjacent wall panels 10a and 10b by means of bolts 42 and nuts 44, the bolts 42 passing through apertures 41 in the wall panels 10a and 10b.

The wall panel 10 further comprises lower attachment means 46 in the form of an angled second steel bracket 48 which is glued to the first wall panel 10a and which is secured to the concrete footings 18 by means of a bolt 50. The bracket 48 is further secured to the adjacent wall panel 10b by gluing the bracket to the wall panel 10b by means of sealant 64. The second wall panel 10b has an angled lower end 52 to its body portion 20 to accommodate the angled bracket 48.

Figure 8:
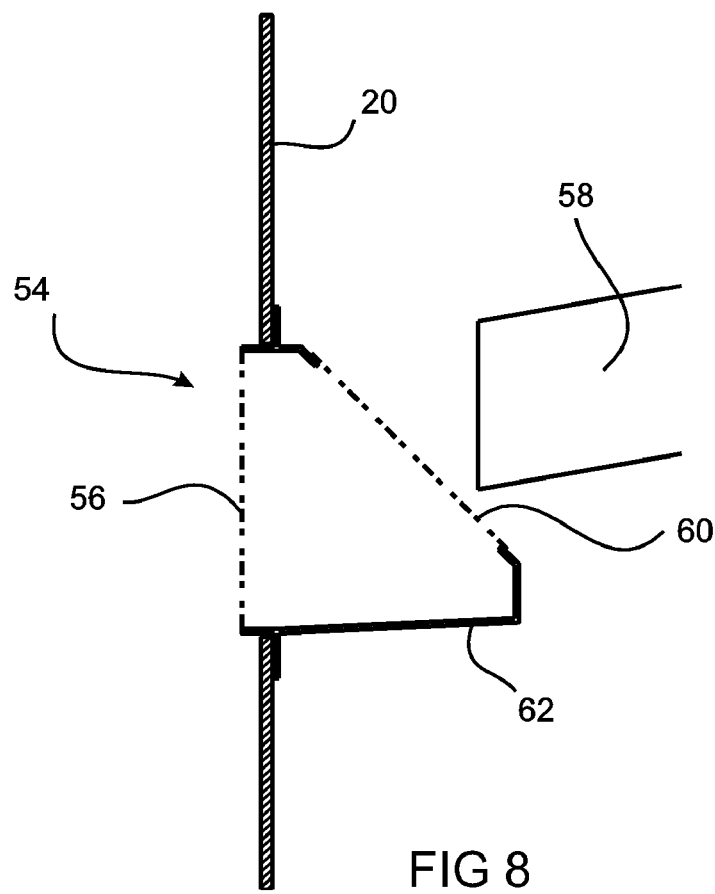
FIG. 8 is an enlarged view of the rain head marked in dotted lines at an upper end of the wall panel in FIG. 1.

The wall panel 10 further comprises an opening 54 positioned near the upper end 34 of the body portion 20, and having a filter mesh 56 as can be seen in FIGS. 1 and 8. Rain water from a guttering downpipe 58 passes through a debris screen 60 and is collected in a rain head 62 before passing through the filter mesh 56 into the cavity 22 of the wall panel 10.

Adjacent wall panels 10 are joined to form the wall panel system 12 by means of joining means in the form of a sealant 64 such a fibreglass glue which bonds adjacent wall panels 10a and 10b together to form the wall panel system 12. The sealant 64 is placed in a 5 mm gap between adjacent panels 10a and 10b to join the panels together (see FIGS. 5 and 6). In this way, the wall panels 10 are securely bonded together to form an integral system 12. This bonding provides strength to the overall structure and assists in giving the wall panel system its strength to support the roof structure 16.

As can best be seen in FIG. 7, the wall panel 10 further comprises connecting means 66 to allow fluid communication between adjacent panels for the transfer of water between the panels. In this embodiment the connecting means 66 is in the form of a male connector 68 provided in a wall panel 10b and having an aperture 70 therein, which is compatible with a female connector 72 provided in an adjacent wall panel 10c. Thus water may pass from the cavity 22b of wall panel 10b through the aperture 70 to the cavity 22c of wall panel 10c.

In the first embodiment as described, wall panels 10 in the wall panel system 12 are positioned around a single storey building in the form of a garage 14 as can be seen in FIGS. 2 and 3. A row of eight wall panels 10 are positioned in a vertical orientation on two sides of the garage 14 and a row of six wall panels 10 are positioned on a third side of the garage. These three rows of wall panels 10 form the three side walls of the garage 14 and support the roof structure 16. The fourth side of the garage is completed with a garage door.

Figure 10:
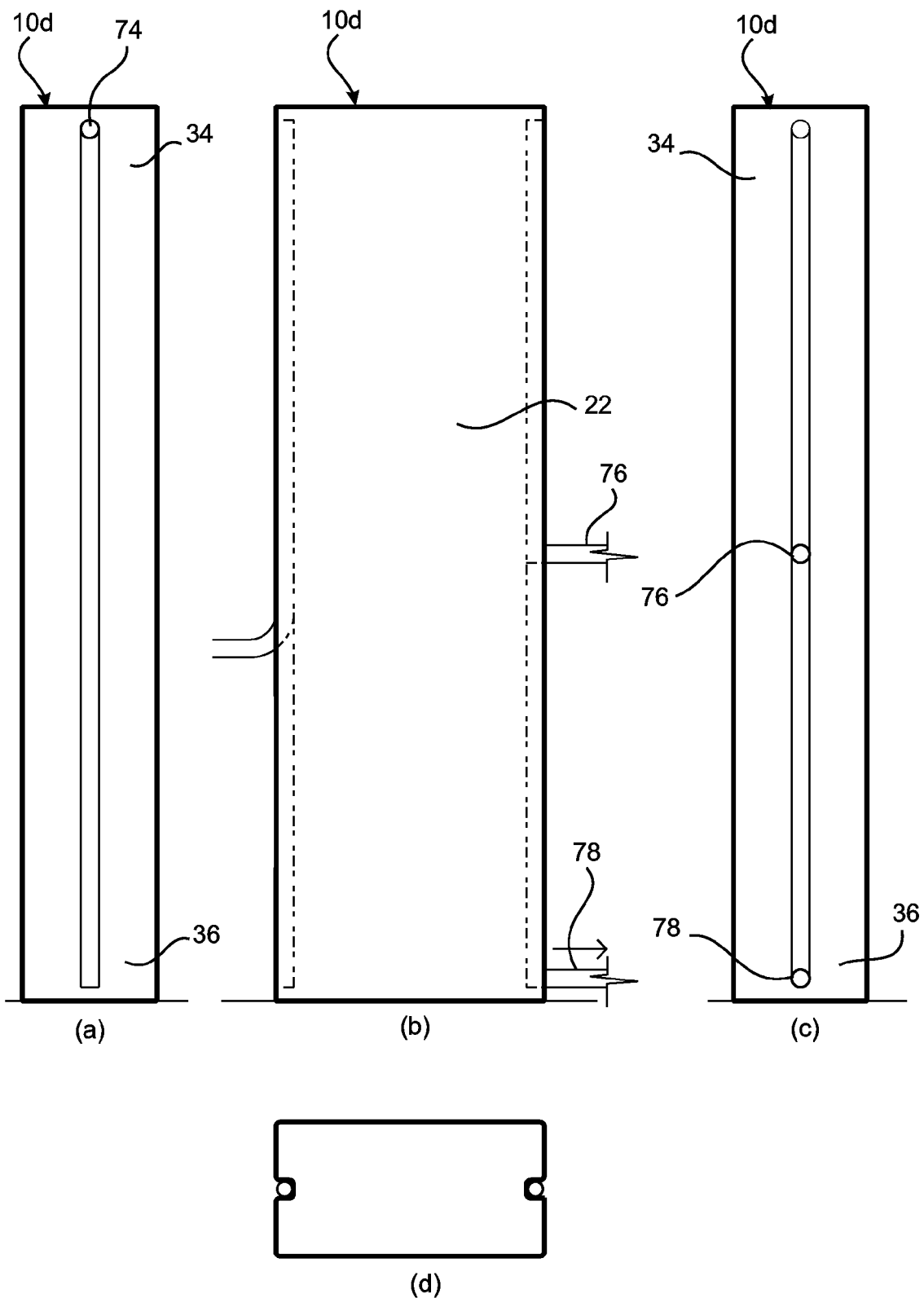
FIGS. 10(a) to (d) show a left side, a front, a right side and a top plan view respectively of a second embodiment of a wall panel of the invention illustrating its use for grey water storage.
Figure 11:
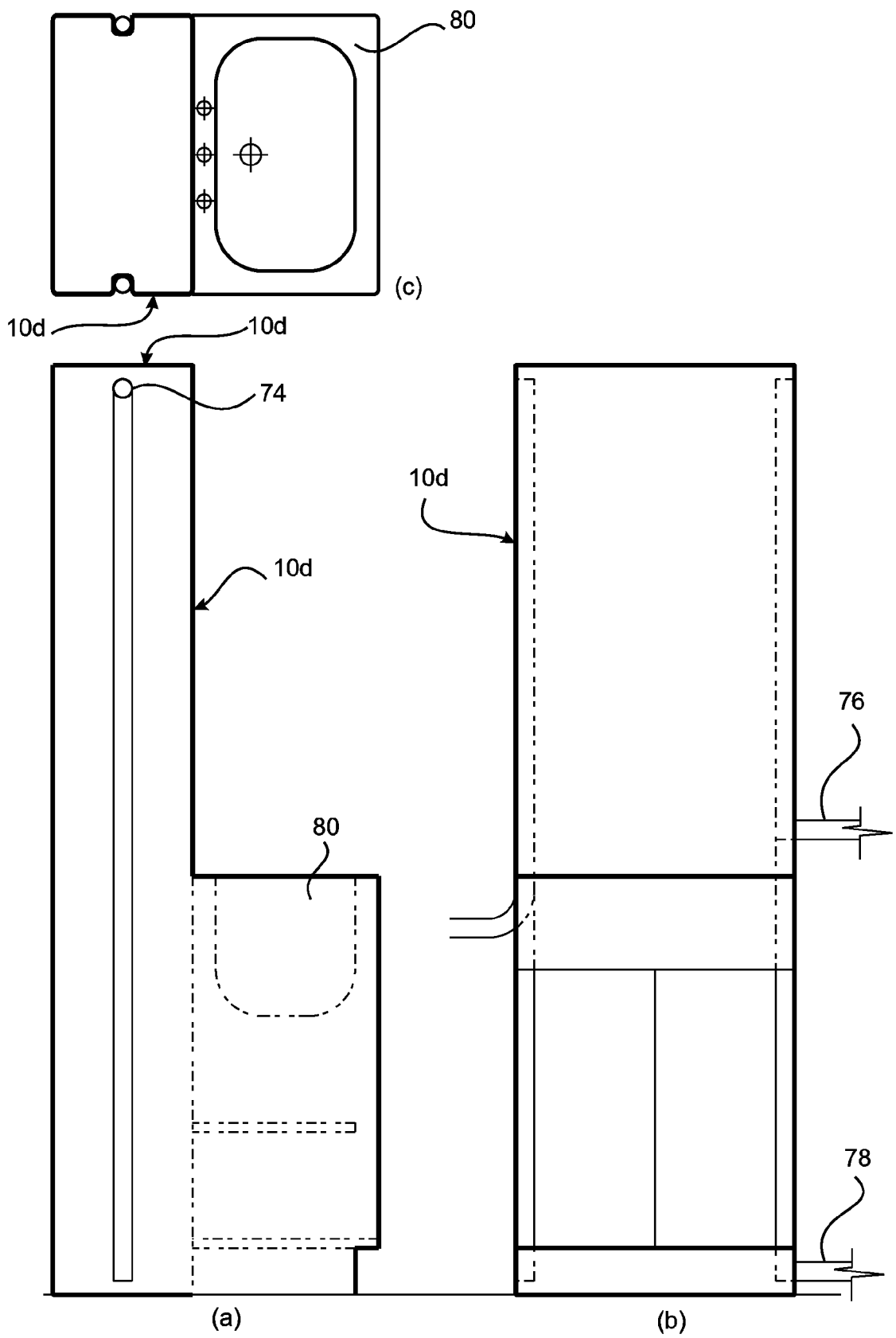
FIGS. 11(a) to (c) show a side, a front and a top plan view respectively of the wall panel of the second embodiment illustrating its use in association with a laundry trough.
Figure 15:
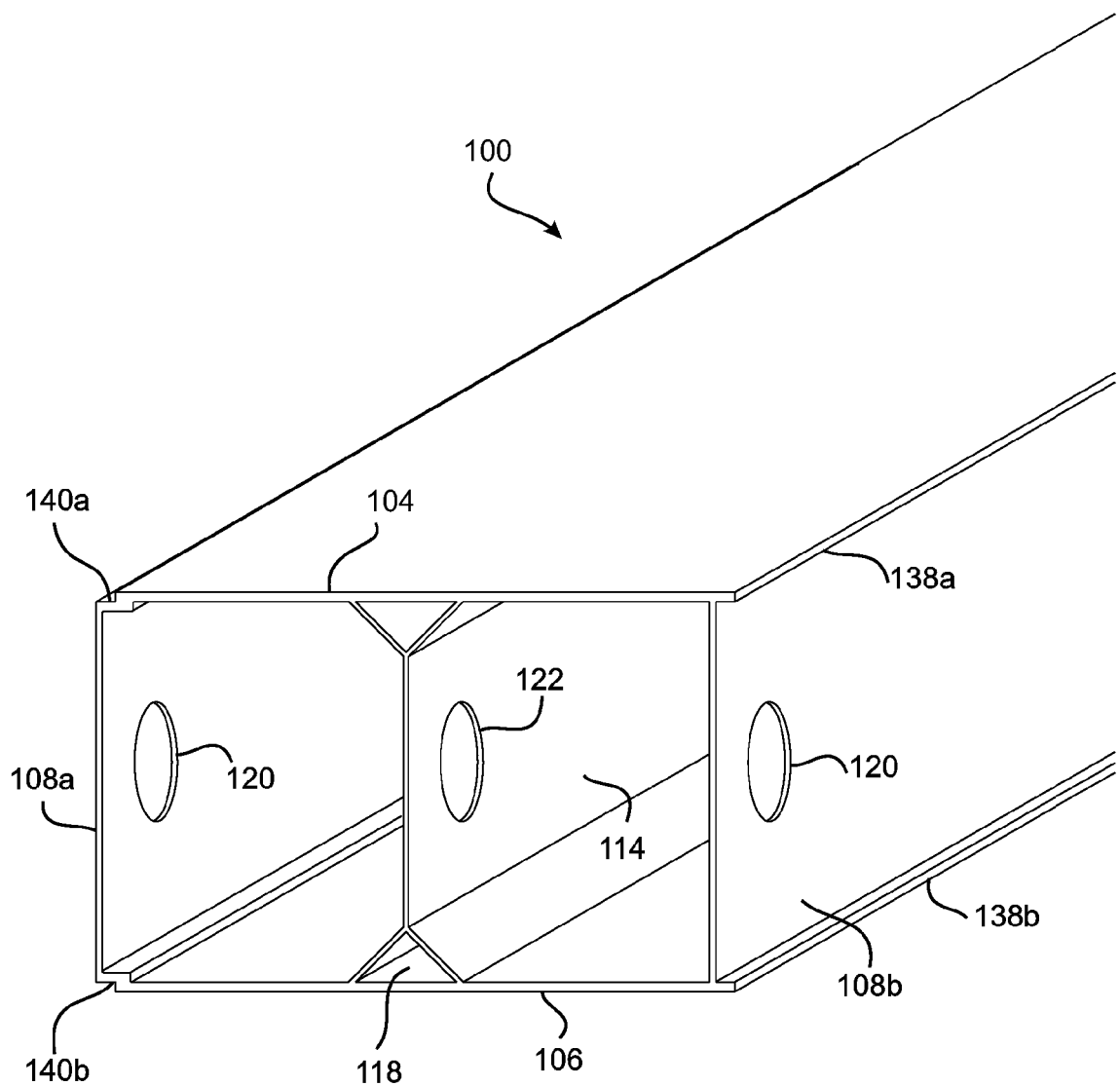
FIG. 15 is an end perspective view of the wall panel of FIG. 13.

A second embodiment of the wall panel 10 according to the invention as shown in FIGS. 10 and 11 illustrates how a wall panel 10d may be adapted to take grey water from a washing machine (not shown) to either a toilet cistern (not shown) or to the garden. An intake pipe 74 is positioned at the upper end 34 of the body portion 20 of the wall panel 10d to allow waste water from a washing machine to pass into the cavity 22. The wall panel 10d is provided with a suitable outlet pipe 76 spaced at a distance from the upper end 34 of the wall panel 10d to allow water to pass to a toilet cistern. Thus with the assistance of gravity, the flow of waste water passing from the outlet pipe 76 to a toilet cistern is used to flush a toilet (not shown). The wall panel 10d is also provided with a second outlet pipe 78 at the lower end 36 of the panel 10d to allow waste water to be removed for the purposes of garden reticulation.

FIG. 11 shows how the arrangement of FIG. 10 may be incorporated into a design in association with a laundry trough 80. The wall panel 10d is positioned next to the washing machine (not shown in the drawings) and behind the laundry trough 80 making a compact design suitable for the usual small space of a laundry. Since a laundry is usually positioned in close proximity to a toilet in a home, the plumbing for the arrangement shown in FIGS. 10 and 11 can be arranged in a cost-effective manner.

It has been estimated that the average amount of water used daily in a laundry is about 130 liters which is close to the amount of water required to flush toilets in an average household on a daily basis. Thus it can be seen that the present invention provides the further benefit of allowing the design of a system that can effectively use grey waste water.

A third embodiment of a wall panel 100 according to the invention, as illustrated in FIGS. 12 to 18, comprises an elongate hollow body portion 102 having a storage cavity 103 provided therein for retaining water. The body portion 102 has a quadrilateral cross-section defined by an inner wall 104 and an outer wall 106 held in spaced apart relation by two side walls 108a and 108b as can be seen most clearly in FIG. 14. Each side wall 108 is adapted to be joined to the side wall 108 of an adjacent wall panel 100' so as to form a wall tank 110 for a building as shown in FIG. 12. Each wall panel 100 thus forms a structural component of the wall 110, which is sufficiently strong to support a roof structure 112 thereon.

In this embodiment the body portion 102 has a substantially rectangular cross-section and each of the inner, outer and side walls of the body portion are substantially planar. The inner wall 104 of the body portion is oriented substantially parallel to the outer wall 106, and the two side walls 108 are also oriented substantially parallel to each other. However it will be understood that the body portion 102 could have a variety of other cross-sectional shapes, for example, a rhomboid cross-section. Advantageously the body portion 102 further comprises an internal wall 114 extending between the inner and outer walls 104 and 106, oriented substantially parallel to the side walls 108, to provide additional structural strength and rigidity. As can be seen most clearly in FIGS. 14 and 15, the internal wall 114 is fixed to the inner and outer walls 104 and 106 by means of a respective pair of webs 116, that together with the inner wall 104 and the outer wall 106 respectively form a pair of dry cells 118 that are sealed off from the remainder of the cavity 103. Dry cells 118 may be used as ducting for electrical cabling or plumbing in the wall tank 110.

Each wall panel 100 typically has outer dimensions of approximately 400 mm by 250 mm by 2600 mm and is made of UV stabilised potable water grade, structural fibreglass. The body portion 102 is preferably made of structural reinforced plastic or high density structural fibreglass. These materials assist in giving the panel 100 the required strength to form an effective structural component of the building and to have the strength to support a roof structure. The inner and outer walls 104 and 106 are preferably about 6 mm thick, whilst the side walls 108 are preferably about 4 mm thick. The side walls can be thinner as they effectively form a wall of 8 mm thickness when two wall panels 100 are joined together. The internal wall 114 is typically about 3 mm thick. The storage cavity 103 of the wall panel is typically designed to hold about 260 liters of water but this size can be varied to suit particular needs.

Both of the side walls 108 are provided with an opening 120 therein, adapted to align with a matching opening 120' in the side wall 108' of an adjacent wall panel 100', to permit the communication of water from the cavity 103 in one wall panel to the cavity 103' in the adjacent wall panel. In this embodiment the opening 120 is positioned adjacent a lower end of the body portion 102. Preferably the internal wall 114 is similarly provided with an opening 122 to permit water in the cavity 103 to communicate from one side of the internal wall 114 to the other.

The wall panel 100 further comprises a lower wall 130 for sealing the lower end of the body portion 102, and an upper wall 132 for sealing the upper end of the body portion 102. The storage cavity 103 is preferably bounded by the inner, outer, side, upper and lower walls so that the storage volume provided by the cavity 103 in the panel 102 is maximized. The upper wall may be in the form of a lid 132 adapted to seal the upper ends of the body portions 102 of a plurality of wall panels 100 arranged side by side to form a wall tank 110. The lower wall may be in the form of a tray 130 adapted to seal the lower ends of the body portions 102 of a plurality of wall panels 100 arranged side by side to form a wall 110, the tray 130 thus forming a base of the wall. In this embodiment the lid 132 has a beam 134 formed integral therewith and shaped to accept roof rafters 136 thereon. The lid 132 with integrated beam 134 may be manufactured using pultruded 4 mm fibreglass.

The wall panel 100 further comprises connecting means to assist in connecting the side walls 108 of adjacent body portions 102 together. In this embodiment the connecting means comprises first and second lips 138a and 138b extending longitudinally along first and second edges of one side wall 108b of the body portion 102. Matching first and second recesses 140a and 140b extend longitudinally along first and second edges of the other side wall 108a of the body portion 102. When adjacent wall panels 100 are joined together the first and second lips 138 on the side wall 108b of one wall panel 100 are received in the matching first and second recesses 140' in the side wall 108a' of the adjoining wall panel 100' in overlapping relation, as can seen most clearly in FIG. 14. This overlapping helps to provide a watertight seal at the join.

Adjacent wall panels 100 are joined to form a wall tank 110 by means of fastening means in the form of a chemical bonding agent or sealant, such as fibreglass glue, which bonds and seals adjacent side walls 108a and 108b' together to form the wall 110. In this way, the wall panels 100 are securely bonded together to form an integral wall structure. This bonding provides additional strength to the overall structure and assists in giving the wall tank the strength and rigidity to support the roof structure 112. The fastening means may also comprise mechanical means such as bolts, screws, or brackets. However, it is important that the join between the side walls 108 in the region of the openings 120 is thoroughly sealed to prevent leakage of water between the side walls 108.

The body portion 102 of selected wall panels 100 further comprises an inlet opening 142 adapted to allow collected rainwater to pass into the storage cavity 103. The inlet opening 142 is preferably located at the upper end of the body portion 102 and may be connected to an outlet of a guttering downpipe 144, as shown in FIGS. 12 and 16. In this way rainwater collected from the roof passes into the cavity 103 for storage and later use as required. The inlet opening 142 may be fitted with a rain head 146, as shown in FIGS. 16, 17 and 18. Rain head 146 is fitted with a course filter mesh 148a to inhibit ingress of leaves, twigs and stones, and a fine filter mesh 148b to inhibit ingress of sand, insects and other debris, into the storage cavity 103 when rainwater passes from the guttering downpipe 142 into the storage cavity 103.

The wall panel 100 is preferably further provided with a dispensing means such as one or more water taps (not illustrated), to permit water to be dispensed from the storage cavity 103.

Figure 9:
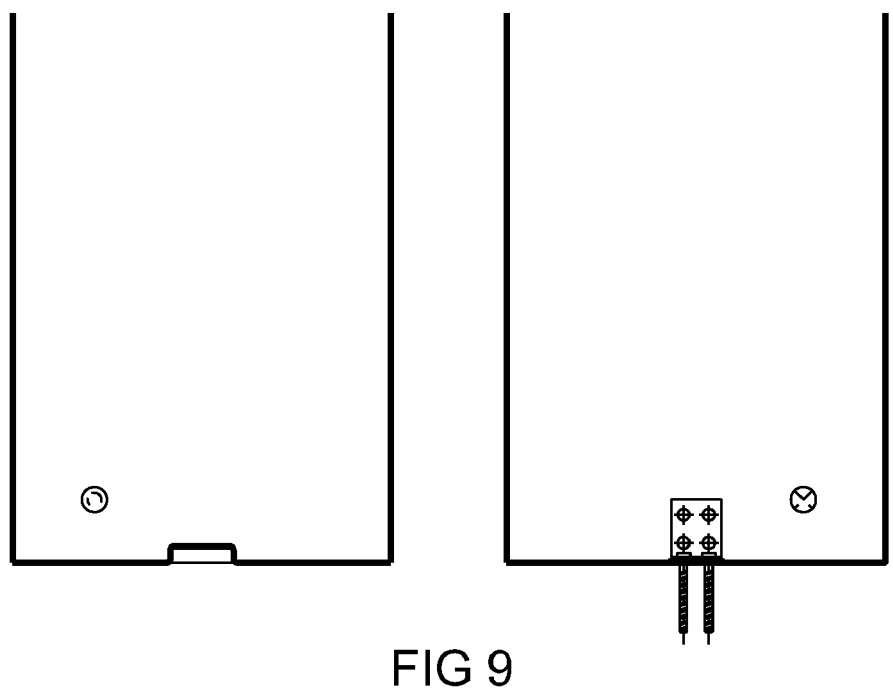
FIG. 9 is a side view of the lower end of a wall panel according to the first embodiment.
Figure 19:
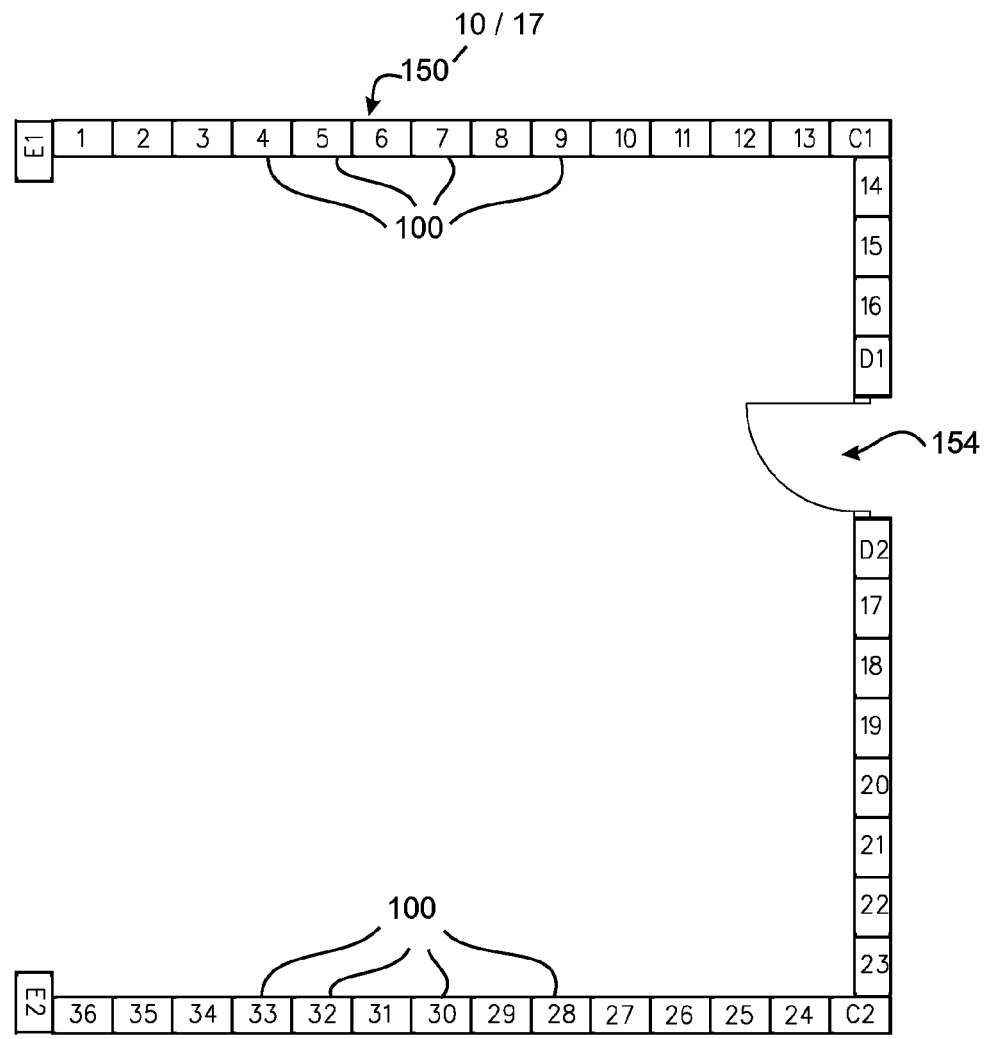
FIG. 19 is a plan view of a garage built using the wall panel system of FIG. 12.
Figure 20:
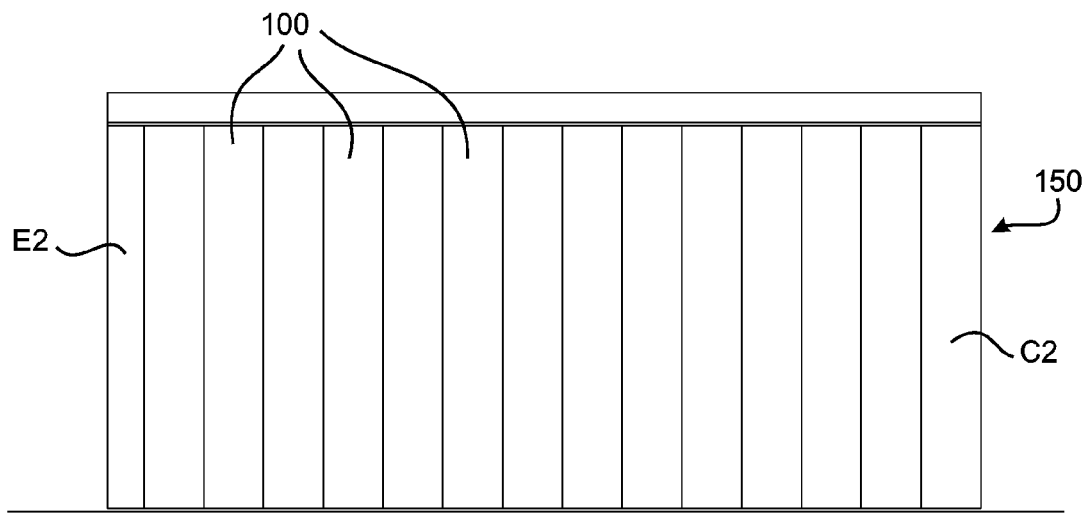
FIG. 20 is a side view of the garage of FIG. 19 (roof structure not shown)
Figure 21:
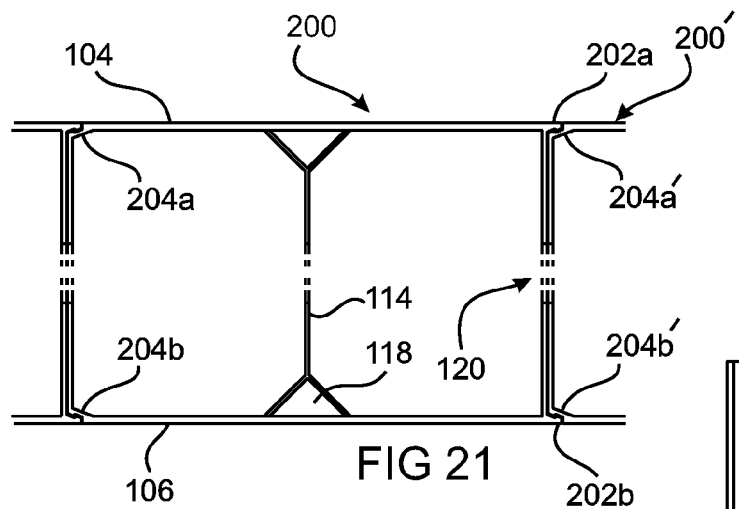
FIG. 21 is a section view of a fourth embodiment of a wall panel system according to the invention.
Figure 22:
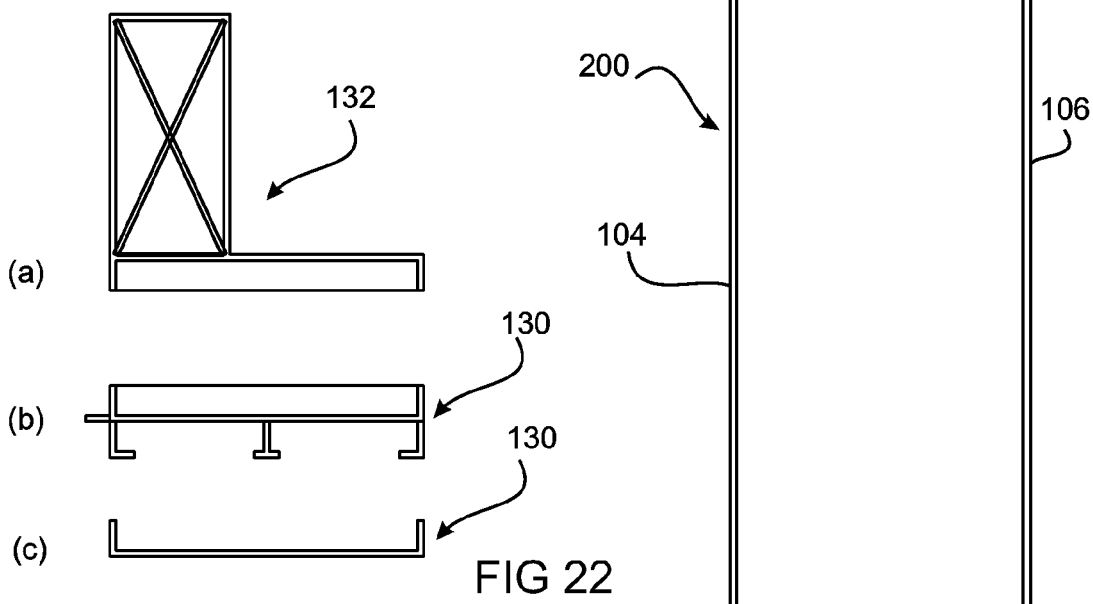
FIG. 22(a) is an end profile of one embodiment of a lid with integrated beam employed in the wall panel system of FIG. 21.
FIG. 22(b) is an end profile of one embodiment of a base tray for the wall panels employed in the wall panel system of FIG. 21.
FIG. 22(c) is an end profile of second embodiment of a base tray for the wall panels employed in the wall panel system of FIG. 21.
Figure 23:
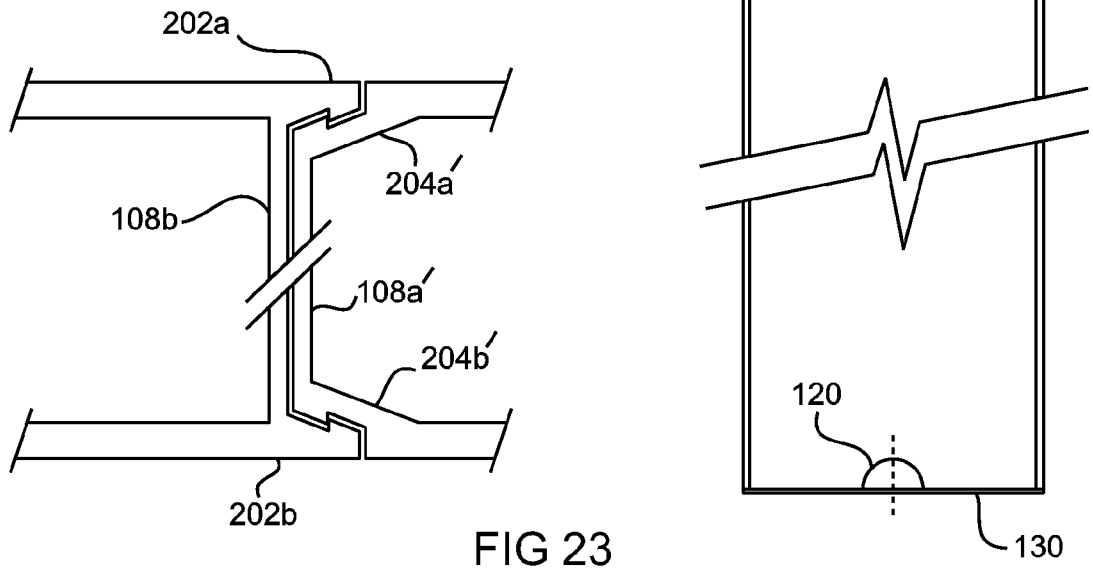
FIG. 23 is an enlarged section view illustrating one embodiment of a connecting means for the wall panels employed in the wall panel system of FIG. 21.
Figure 24:
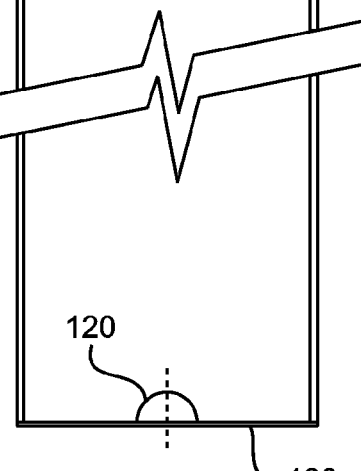
FIG. 24 is a side view of a wall panel employed in the wall panel system of FIG. 21 with a lid at the top.

FIGS. 19 and 20 illustrate a garage built using the above described third embodiment of the wall panel system according to the invention. The garage is approximately 6.1×6.1 m square in area and the walls are constructed using thirty six of the wall panels 100 joined side to side to form three walls of the garage. Thirteen wall panels 100 are joined side by side to form the side walls 150 of the garage as shown in FIG. 9. A special end unit E2 and corner unit C2 is employed at each end of the wall tank 150 to terminate the wall. The end unit E2 and corner unit C2 are both fitted with a connecting means (in this case a female filler) to seal off the ends of the wall 150. The opposite garage wall 150' is provided with a similar end unit E1 and corner unit C1. The rear wall tank 152 of the garage is formed from twelve of the wall panels 100 joined side to side with a gap left for a doorway 154. Here again special end units D1 and D2 are provided to seal off the ends of the wall panels on the respective sides of the doorway 154 and provide a door frame for a door.

FIGS. 21 to 29 illustrate a fourth embodiment of the wall panel 200 and wall panel system of the invention. The wall panel 200 of this embodiment is similar in many respects to the wall panel 100 of the third embodiment, and therefore the like parts will be identified with the same reference numerals and will not be described again in detail.

Probably the most significant difference between the wall panel 200 and the previous embodiment is the configuration of the connecting means for connecting the side walls 108 of adjacent body portions 102 together. In this embodiment the connecting means similarly comprises first and second lips 202a and 202b extending longitudinally along first and second edges of one side wall 108b of the body portion 102. Matching first and second recesses 204a and 204b extend longitudinally along first and second edges of the other side wall 108a of the body portion 102, in a similar fashion to that of the previous embodiment. However in this embodiment the first and second lips 202 and matching recesses 204 are provided with a key system, wherein the lips 202 are keyed to the recesses 204 to further inhibit separation of adjacent wall panels once they are joined. When adjacent wall panels 100 are joined together the first and second lips 202 on the side wall 108b of one wall panel 100 clip onto the matching first and second recesses 204' in the side wall 108a' of the adjoining wall panel 100' in overlapping relation, as can be seen most clearly in FIGS. 23 and 27. Here again the overlapping helps to provide a watertight seal at the join, whereas the keying of the lips in the recesses helps to hold the side walls 108 firmly connected together.

Another difference in the wall panels 200 of the fourth embodiment is the location of the openings 120 in the side walls 108 of the panel. As can be seen most clearly in FIG. 24, the opening 120 is provided at the bottom of the body portion 102 with a semicircular shape closed of at the bottom by the lower wall 130 of the body portion. FIG. 22(b) and (c) illustrate two different types of lower walls or trays 130 that may be used to form the base of the wall tank formed by the wall panels in the system. The tray of FIG. 22(b) has three holding legs for supporting the base above the surface of a concrete footing (see also FIG. 31). This may be desirable where electrical or plumbing services need to be installed below the wall tank. The tray of FIG. 22(c) has a flat base and is similar to that of the previous embodiment. Either type of tray 130 is bonded to the bottom of the body portion 102 with a suitable bonding agent or sealant such as fibreglass glue. FIG. 22(a) illustrates an upper wall or lid 132 for the body portion 102, similar to the lid 132 of the previous embodiment.

Figure 25:
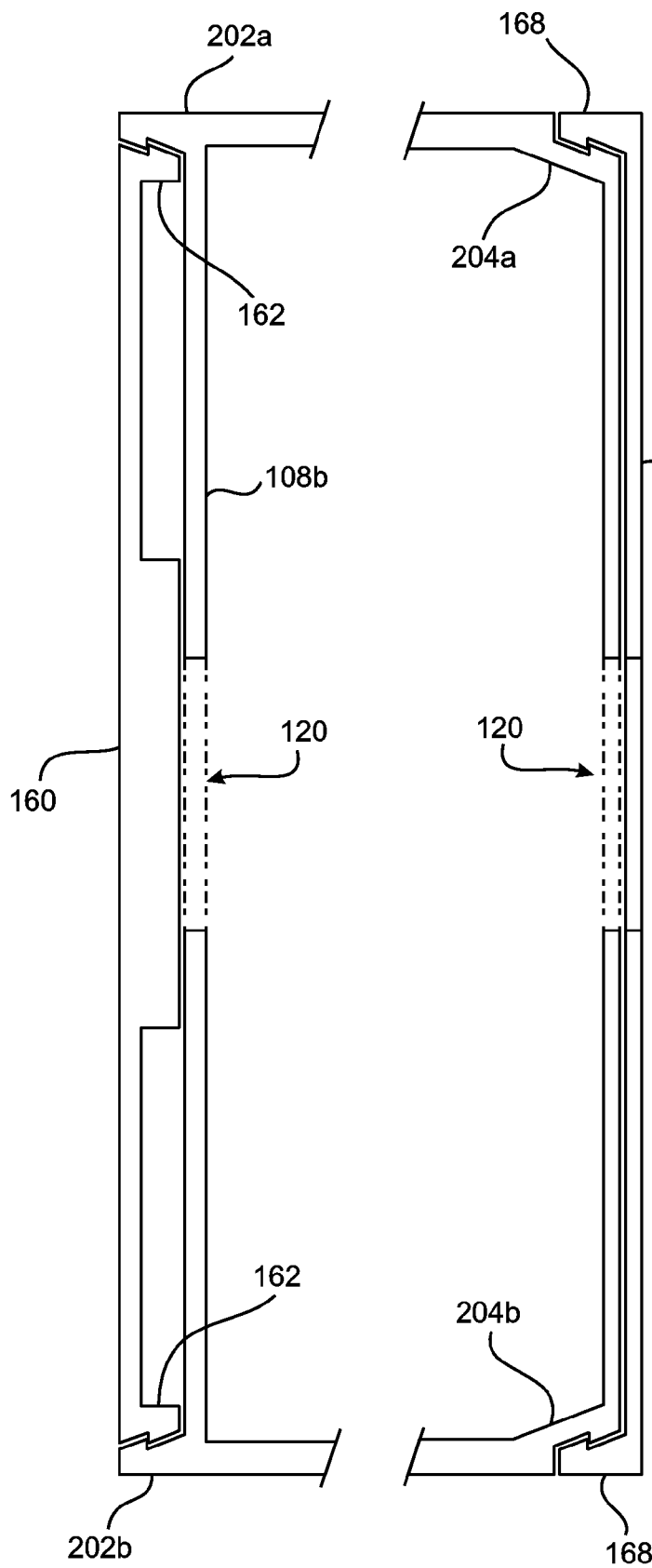
FIGS. 25 and 26 are enlarged section views illustrating one embodiment of a male end cap and a female end cap respectively employed in the wall panel system of FIG. 21.
Figure 26:
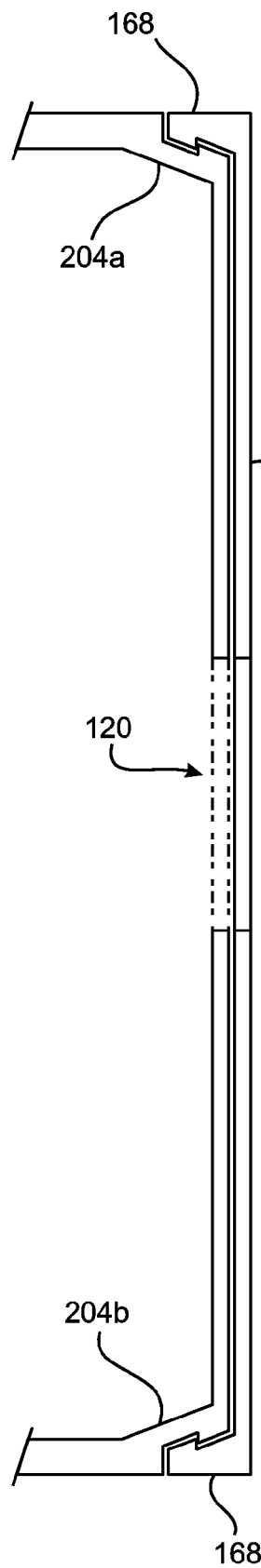
Figure 27:
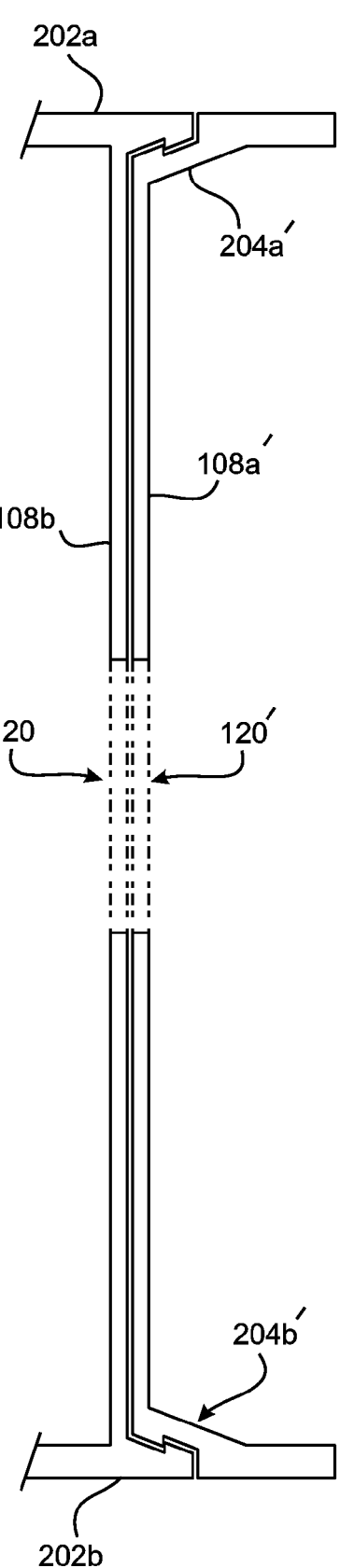
FIG. 27 is an enlarged section view of the side walls of adjoining wall panels employed in the wall panel system of FIG. 21.

Whenever a wall tank built using the wall panels 200 of the wall panel system is required to be terminated, special end caps may be used to seal off the openings 120 in the exposed side walls 108 of the wall panels 200. FIG. 25 illustrates a male end cap 160 used to seal a female end of the wall panel 200. The male end cap 160 is fitted with keyed protrusions 162 that are keyed to the lips 202 on the wall panel. FIG. 26 illustrates a female end cap 166 used to seal a male end of the wall panel 200. The female end cap 166 is fitted with keyed lips 168 that are keyed to the recesses 204 on the wall panel 200. FIG. 27 merely illustrates how the holes 120 in the side walls 108 of the wall panels 200 align when two adjacent wall panels are joined in side by side arrangement.

Figure 28:
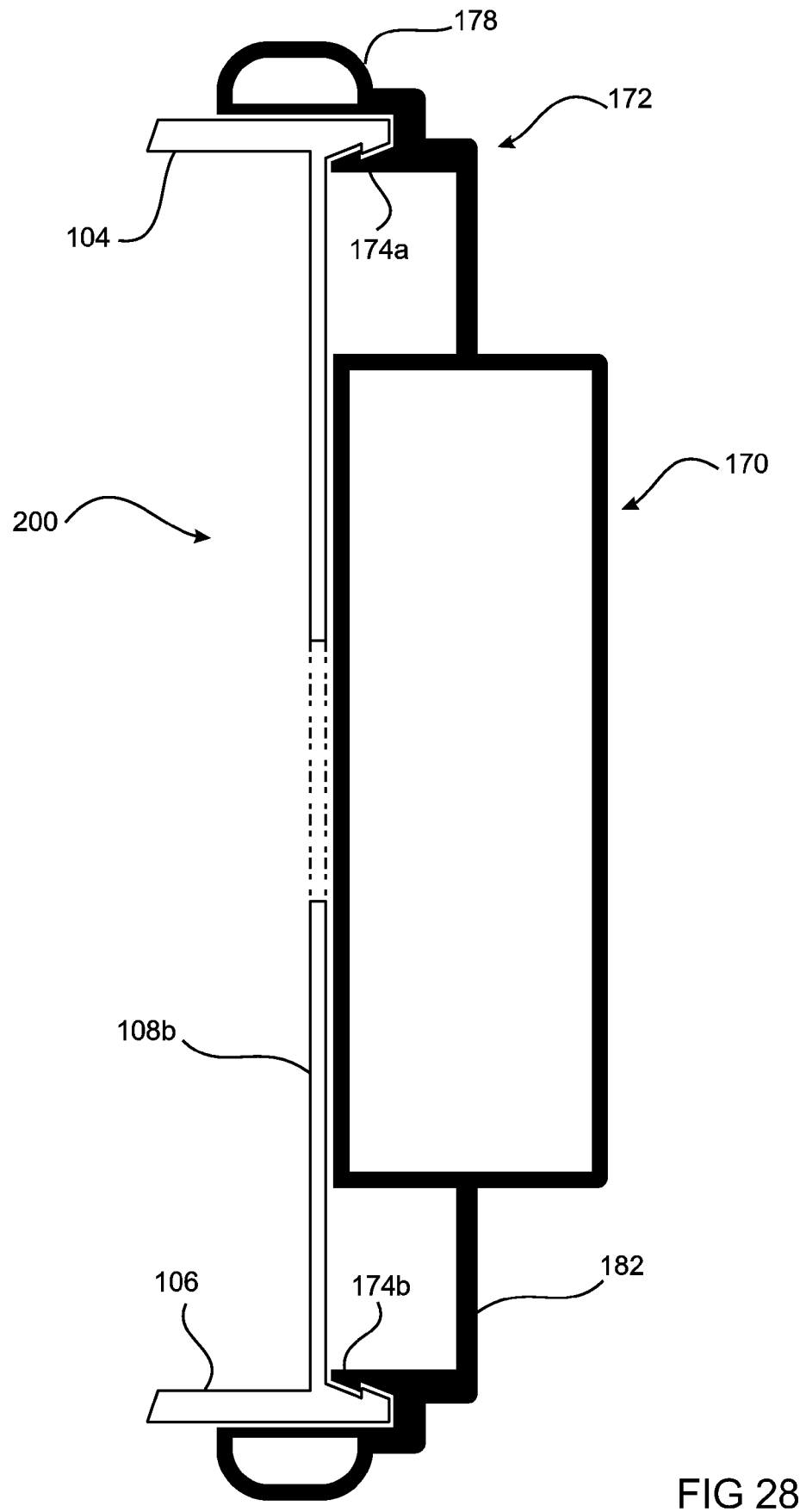
FIGS. 28 and 29 are enlarged section views illustrating one embodiment of a door frame that may be employed in the wall panel system of FIG. 21.
Figure 29:
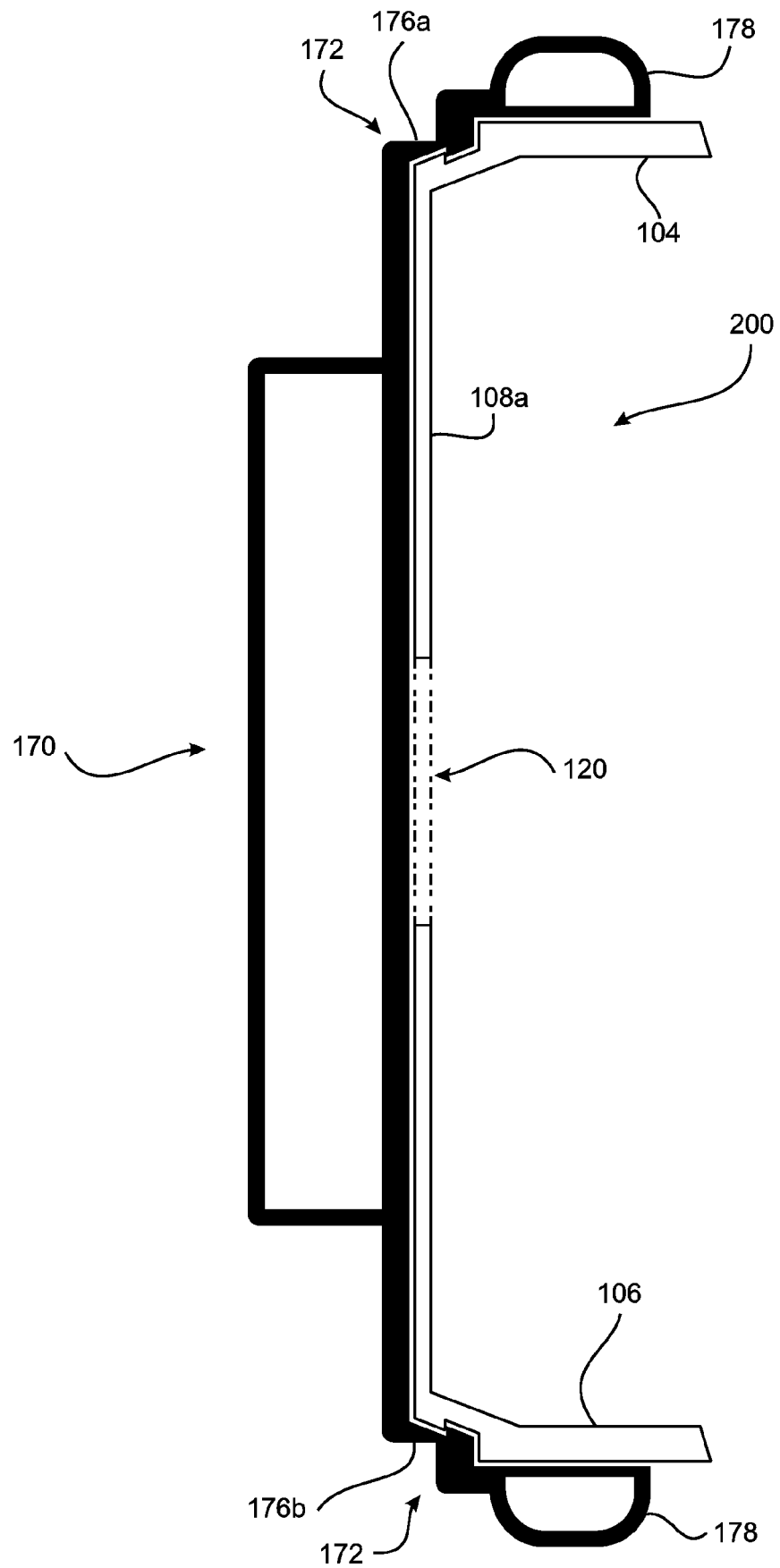

The wall panel system of this embodiment may further comprise a door frame 170 adapted to be connected to the side walls 108 of wall panels 200 on respective male and females sides of the doorway. FIGS. 28 and 29 illustrate door frame details for the female and male sides of the doorway respectively. The door frame 170 is provided with connecting means 172 comprising first and second lips 174 extending longitudinally on one side of the door frame 170 (as shown in FIG. 29), and first and second matching recesses 176 extending longitudinally on the other side of the door frame 170 (as shown in FIG. 28). The lips 174 and matching recesses 176 are adapted to connect with respective matching recesses 204 and lips 202 provided on the side walls 108 of the wall panels 100 on respective sides of the doorway. Handles 178 are provided on the connecting means 172 to provide easy handling of the door frame during installation. A door 180 may be hung in the doorframe 170 by riveting the hinges 182 to the doorframe as shown in FIG. 28.

Figure 30:
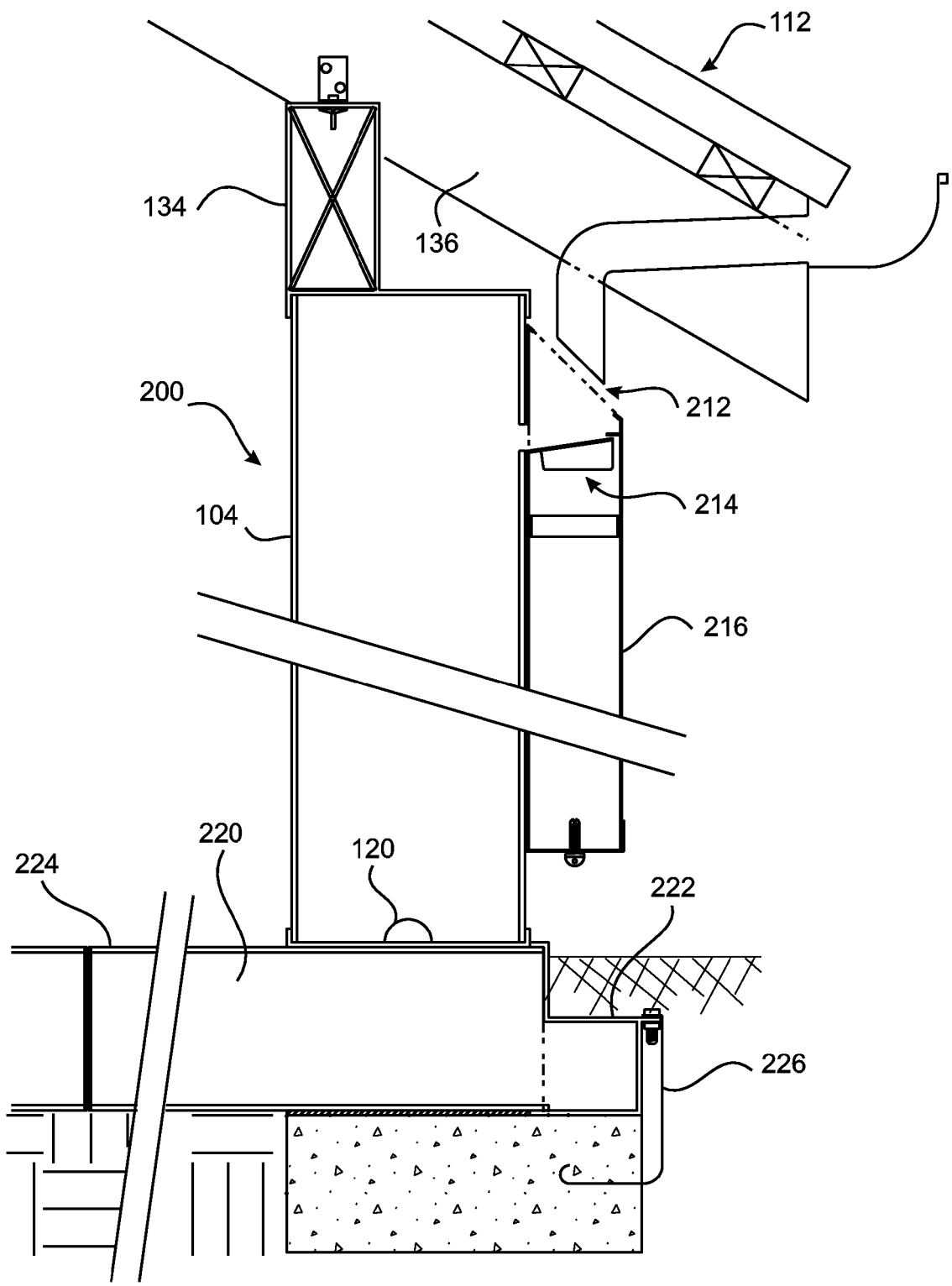
FIG. 30 is an end section view of a wall made using the wall panel system of FIG. 21 and incorporating a floor tank.
Figure 31:
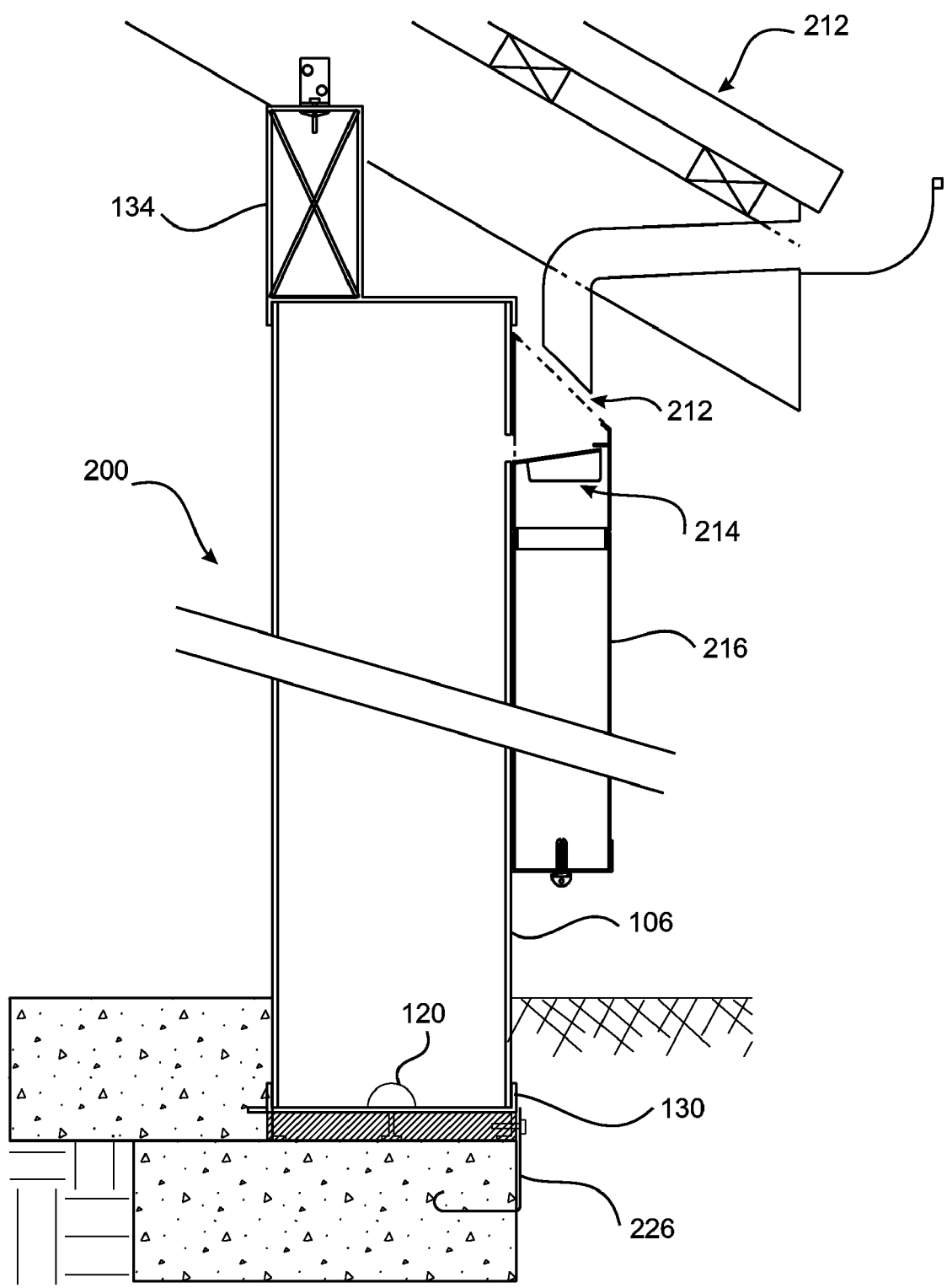
FIG. 31 is an end section view of a wall made using the wall panel system of FIG. 21.

FIGS. 30 and 31 illustrate a wall built using the wall panels 200 of the fourth embodiment of the wall panel system. An inlet opening 142 in selected wall panels 200 is provided with a rain head 212 at the fill point, similar to the rain head 146 illustrated in FIGS. 16 to 18. However the rain head 212 is fitted with a rain diverter 214 to flush the roof of debris prior to filling or to divert the rain water to a standard downpipe 216 when the storage cavities in the wall panels are full.

The wall panel system may further comprise floor tank 220 situated in a floor of the building for storing water. The floor tank 220 may be one of a plurality of floor tanks. In the embodiment illustrated in FIG. 30 a plurality of floor tanks 220 are interconnected by means of a connection cap 222 that fits over the ends of multiple tanks to allow communication of water between the tanks. Advantageously the tray 130 at the base of the wall tank, formed by the wall panels 200, rests on an upper surface 224 of the floor tank or tanks 220. A plurality of stainless steel straps 226 are bolted to the connection cap 222 for securing the wall to a concrete footing, to provide additional security in cyclone prone areas.

The wall tank of FIG. 31 is similar to that of FIG. 19 except that there is no floor tank, and the base of the wall tank is supported above the concrete footing by a tray 130 similar to that illustrated in FIG. 22(b). A plurality of stainless steel straps 226 are bolted to the tray 130 at the base for securing the wall 210 to the concrete footing, to provide additional security in cyclone prone areas.

FIGS. 32 to 35 illustrate a fifth embodiment of a wall panel 300 and wall panel system of the invention. The wall panel 300 of this embodiment is similar in some respects to the wall panel 200 of the fourth embodiment, and therefore the like parts will be identified with the same reference numerals and will not be described again in detail.

A significant difference between the wall panel 300 and the previous embodiment is the configuration of the connecting means 302 for connecting the adjacent wall panels of the wall panel system together. In this embodiment the connecting means comprises a male connector fitting 304 fitted and sealed into an aperture 306 (see FIG. 35) provided near a lower end of the body portion 102 of the wall panel, and double-sided female connector fitting 308, as can be seen most clearly in FIG. 34. The female connector fitting 308 is received in a fluid-tight connection on the protruding portion of the male connector fitting 304 of one panel 300 and also on the protruding portion of the male connector fitting 304' of an adjacent panel 300'.

Another significant difference is the configuration of the side walls of the wall panel 300. In this embodiment the side walls comprise a central planar portion 310 with two recessed portions 312 either side, as can be seen most clearly in FIGS. 32 and 33. The wall panels are joined end to end by simply abutting the central planar portion 310 of one panel 300 to the central planar portion 310' of an adjacent panel 300'. Fastening means for fixing adjacent panels together may comprise chemical means, for example a bonding agent, sealant, or glue such as fibreglass glue. Unlike the previous embodiments there are no openings in the abutting side wall portions 310. Instead, fluid communication between adjacent panels is provided via the connecting means 302. Water flows from one panel into the next panel through the female connector fitting 308 connecting adjoining male connector fittings 304.

Advantageously the connecting means 302 is accommodated within the recess formed between adjacent wall panels on one side of the wall panel system by the facing recessed portions 312*a* and 312*a*'. A similar recess formed on the other side of the wall panel system by the facing recessed portions 312*b* and 312*b*' may be used as a dry cell for accommodating services such as electricity, telephone, computer, etc. Preferably the recesses thus formed on either side of the wall panel system are covered by a respective wall cap 316 which is received in respective recessed edges 318 and 318' of the inner and outer walls 104 and 106 of the adjoining wall panels, as can be seen most clearly in FIGS. 33 and 34. The wall caps 316 thus sit flush with the inner and outer walls 104 and 106 of the wall panels 300.

A preferred method of constructing a wall panel system using the wall panels 300 will now be described with reference to FIG. 32 to 35. Firstly, the base tray 130 is fixed in the correct position on the concrete footings or slab for the building structure using suitable fasteners (see FIG. 35). Then each of a plurality of the wall panels 300 are fitted into the tray 130, correctly aligned and fastened together using a suitable bonding agent, sealant, or glue such as fibreglass glue. At the same time adjacent wall panels are connected together via a female connector fitting 308 received in a fluid-tight connection on the protruding portions of respective male connector fittings 304 of adjacent panels. Next, wall caps 316 are fitted over the recesses formed between the wall panels 300 to make the wall flush as shown in FIG. 35. Lastly, the lid 132 is installed on top of the wall panels 300 over substantially the full length of the wall panel system, and is fastened to the wall panels using a suitable bonding agent.

Thus it can be seen that the present invention provides a way of collecting rain water for storage purposes in a wall of a building made from a plurality of wall panels joined side by side. The wall panels further provide sufficient strength so that it may be used as a secure structural means for supporting the roof structure of a building. The rain water may be conveniently stored in one or more of the panels for later use as required. As an alternative, the wall panel may be adapted to store water other than rain water, such as grey water from household use. The grey water may then be recycled for use in toilet cisterns or for use on gardens.

The foregoing description of several preferred embodiments of the wall panel and wall panel system illustrate a number of advantageous features, including the following:

(a) The wall panel and wall panel system provide a means for collecting and storing water, especially rainwater which runs off a roof and which is usually lost to drains and to the ground;

(b) At the same time as providing a storage means for water, the design of the wall panel provides a means for securely supporting a roof structure of a building and allows the wall panel to be incorporated into the overall building design thereby providing a viable alternative to a conventional wall;

(c) The wall panels are relatively cheap and easy to fabricate and may be erected more quickly than brickwork thereby saving on labour costs as well as making the panels suitable for use by the home handyman;

(d) The wall panels are lighter to transport and erect than brickwork which eliminates the need for lifting machinery;

(e) Since the wall panels are incorporated into the building structure to form a wall tank, the wall panel system provides for an aesthetically pleasing water storage container; and (f) The wall panels have good sound and thermal insulation properties.

It will be readily apparent to persons skilled in the relevant art that various modifications and improvements may be made to the foregoing embodiments, in addition to those already described, without departing from the basic inventive concepts of the present invention. For example, the size of the wall panels may be varied to suit the requirements of a particular building. Furthermore the design of the wall panels may allow for a heating system to be incorporated therein to heat water being stored in the wall panels. The exterior surface of the wall panels may be provided in various colours or textures to suit the style of the particular building. Therefore, it will be appreciated that the scope of the invention is not limited to the specific embodiments described and is to be determined from the appended claims.

The claims defining the invention are as follows:

1. A wall panel comprising:
   a hollow elongate body portion defining a cavity therein for retaining a fluid, the body portion having a quadrilateral cross-section defined by an outer wall and an inner wall held in spaced apart relation by side walls, the body portion further comprising an internal wall extending between said inner and outer walls to provide additional structural strength and rigidity, wherein said internal wall is fixed to the inner and outer walls by a respective pair of webs, that together with the inner wall and outer wall respectively form a pair of dry cells sealed off from the remainder of the cavity;
   an upper attachment means on an upper end of the body portion for fixing the body portion to a first building structure of a building, and
   a lower attachment means on a lower end of the body portion for fixing the body portion to a second building structure of the building, so that in use the wall panel provides a substantially rigid structural component to at least partially support the first building structure load bearing manner.

2. A wall panel as defined in claim 1, wherein the body portion is generally planar and rectangular in shape.

3. A wall panel as defined in claim 2, wherein the body portion includes an upper wall and a lower wall.

4. A wall panel as defined in claim 3, wherein the cavity is bounded by the side, upper and lower walls.

5. A wall panel as defined in claim 4, wherein the upper wall includes a removable lid.

6. A wall panel for storing water in the wall of a building, the wall panel comprising:
   an elongate hollow body portion having a storage cavity therein for retaining water, the body portion having a quadrilateral cross-section defined by an outer wall and an inner wall held in spaced apart relation by side walls, the body portion further comprising an internal wall extending between and perpendicular to said inner and outer walls to provide additional structural strength and rigidity, wherein said internal wall is fixed to the inner and outer walls by a respective pair of webs, that together with the inner wall and outer wall respectively form a pair of dry cells sealed off from the remainder of the cavity,
   each side wall being adapted to be joined to a side wall of an adjacent wall panel to form a wall for a building, and
   each wall panel providing a structural component of the wall sufficiently strong to support a roof structure thereon.

7. A wall panel as defined in claim 6, wherein each of the inner, outer and side walls of the body portion are substantially planar.

8. A wall panel as defined in claim 7, wherein the inner wall of the body portion is oriented substantially parallel to the outer wall.

9. A wall panel as defined in claim 6, wherein the side walls are substantially parallel to each other.

10. A wall panel as defined in claim 9, wherein the body portion has a substantially rectangular cross-section.

11. A wall panel as defined in claim 6, wherein said internal wall is oriented substantially parallel to the side walls.

12. A wall panel as defined in claim 6, wherein at least one of the side walls is provided with an opening therein, adapted to align with a matching opening in a side wall of an adjacent wall panel.

13. A wall panel as defined in claim 12, wherein said opening is positioned adjacent a lower end of the body portion.

14. A wall panel as defined in claim 12, wherein said opening is provided with a male connector fitting adapted to receive a female connector fitting thereon wherein when two adjacent wall panels are aligned side by side the female connector fitting provides a fluid tight connection between the male connector fittings of the adjacent wall panel.

15. A wall panel as defined in claim 6, wherein the wall panel further comprises a lower wall for sealing the lower end of the body portion, and an upper wall for sealing the upper end of the body portion.

16. A wall panel as defined in claim 15, wherein the storage cavity is bounded by said inner, outer, side, upper and lower walls.

17. A wall panel as defined in claim 16, wherein the upper wall is in the form of a lid adapted to seal the upper ends of the body portions of a plurality of wall panels arranged side by side to form a wall.

18. A wall panel as defined in claim 17, wherein the lower wall includes of a base tray adapted to seal the lower ends of the body portions of a plurality of wall panels arranged side by side to form a wall, the base tray forming a base of the wall.

19. A wall panel system for storing water in the wall of a building, the wall panel system comprising:
a plurality of wall panels adapted to be joined in a side by side arrangement so as to form a wall for a building,
each wall panel comprising an elongate hollow body portion having a storage cavity, the body portion having a quadrilateral cross-section defined by an outer wall and an inner wall held in spaced apart relation by two side walls, an internal wall extending between and perpendicular to said inner and outer walls to provide additional structural strength and rigidity, wherein said internal wall is fixed to the inner and outer walls by a respective pair of webs, that together with the inner wall and outer wall respectively form a pair of dry cells sealed off from the remainder of the cavity,
each side wall being adapted to be joined to the side wall of an adjacent wall panel, and
each wall panel providing a structural component of the wall sufficiently strong to support a roof structure thereon.

20. A wall panel system as defined in claim 19, wherein each of the inner, outer and side walls of the body portion of each wall panel are substantially planar.

21. A wall panel system as defined in claim 20, wherein the inner wall of the body portion of each wall panel is oriented substantially parallel to the outer wall.

22. A wall panel system as defined in claim 21, wherein the two side walls are oriented substantially parallel to each other.

23. A wall panel system as defined in claim 22, wherein the body portion has a substantially rectangular cross-section.

24. A wall panel system as defined in claim 19, wherein said internal wall is oriented substantially parallel to the two side walls.

25. A wall panel system as defined in claim 19, wherein at least one of the side walls of each wall panel is provided with an opening therein, adapted to align with a matching opening in a side wall of an adjacent wall panel, to permit the communication of water from the cavity in one wall panel to the cavity in the adjacent wall panel.

26. A wall panel system as defined in claim 25, wherein said opening is positioned adjacent a lower end of the body portion.

27. A wall panel system as defined in claim 25, wherein the internal wall is provided with an opening to permit water in the cavity to communicate from one side of the internal wall to the other.

28. A wall panel system as defined in claim 26, wherein said opening is provided with a male connector fitting adapted to receive a female connector fitting thereon, wherein when two adjacent wall panels are aligned side by side the female connector fitting provides a fluid tight connection between the male connector fittings of the adjacent wall panels.

29. A wall panel system as defined in claim 19, wherein each wall panel further comprises a lower wall for sealing the lower end of the body portion, and an upper wall for sealing the upper end of the body portion.

30. A wall panel system as defined in claim 29, wherein the storage cavity of each wall panel is bounded by said inner, outer, side, upper and lower walls.

31. A wall panel system as defined in claim 30, wherein the upper wall includes a lid adapted to seal the upper ends of the body portions of said plurality of wall panels arranged side by side to form a wall.

32. A wall panel system as defined in claim 30, wherein the lower wall is includes a base tray adapted to seal the lower ends of the body portions of said plurality of wall panels arranged side by side to form a wall, the base tray forming a base of the wall.

33. A wall panel system as defined in claim 31, wherein the lid has a beam formed integral therewith and shaped to accept roof rafters thereon.

34. A wall panel system as defined in claim 19, wherein the body portion of each wall panel is made of structural reinforced plastic or high density structural fiberglass.

35. A wall panel system as defined in claim 19, wherein each wall panel further comprises a connector to assist in connecting side walls of adjacent body portions together.

36. A wall panel system as defined in claim 35, wherein said connecting means comprises first and second lips extending longitudinally along first and second edges of one side wall of the body portion and matching first and second recesses extending longitudinally along first and second edges of the other side wall of the body portion, wherein when adjacent wall panels are joined together the first and second lips on the side wall of one wall panel are received in the matching first and second recesses in the side wall of the adjoining wall panel.

37. A wall panel system as defined in claim 36, wherein said first and second lips and matching recesses are provided with a key system, wherein the lips are keyed to the recesses to further inhibit separation of adjacent wall panels once they are joined.

38. A wall panel system as defined in claim 19, wherein the body portion of at least one wall panel further comprises an opening adapted to allow collected water to pass into the storage cavity.

39. A wall panel system as defined in claim 38, wherein the opening in the at least one wall panel is located at the upper end of the body portion and is connected to an outlet of a guttering downpipe.

40. A wall panel system as defined in claim 39, wherein the opening in the at least one wall panel is fitted with a rain head having a filter mesh.

41. A wall panel system as defined in claim 19, further comprising at least one floor tank for storing water situated in a floor of the building.

* * * * *